United States Patent [19]

Hirose et al.

[11] Patent Number: 5,485,330

[45] Date of Patent: Jan. 16, 1996

[54] DEVICE FOR LOADING AND EJECTING RECORDING MEDIUM REQUIRING PUSHING OF RECORDING MEDIUM FOR EJECTING THE MEDIUM

[75] Inventors: Yoshio Hirose, Urawa; Kenji Matsumoto, Hoya, both of Japan

[73] Assignee: TEAC Corp., Japan

[21] Appl. No.: 267,854

[22] Filed: Jun. 29, 1994

Related U.S. Application Data

[63] Continuation of Ser. No. 992,545, Dec. 17, 1992, abandoned.

[30] Foreign Application Priority Data

| Dec. 27, 1991 | [JP] | Japan | 3-107955 U |
| Dec. 27, 1991 | [JP] | Japan | 3-347169 |
| Dec. 27, 1991 | [JP] | Japan | 3-347173 |
| Dec. 27, 1991 | [JP] | Japan | 3-347192 |
| Dec. 27, 1991 | [JP] | Japan | 3-347213 |

[51] Int. Cl.⁶ ............................................. G11B 17/04
[52] U.S. Cl. ................................. 360/99.06; 369/77.2
[58] Field of Search ........................ 360/99.06, 99.02, 360/96.5, 96.6; 369/75.1, 75.2, 77.1, 77.2; 211/40, DIG. 1; 206/387, 444; 312/9.1, 9.16, 9.19, 9.22, 9.11, 9.57, 9.28, 9.41, 9.47, 9.48, 9.53, 9.54, 9.63

[56] References Cited

U.S. PATENT DOCUMENTS

| 3,945,040 | 3/1976 | Staar | 360/137 |
| 4,235,490 | 11/1980 | Schwartz et al. | 312/9.57 |
| 4,239,109 | 12/1980 | Nielsen et al. | 312/9.57 |
| 4,586,097 | 4/1986 | Koike et al. | 360/99.02 |
| 4,604,666 | 8/1986 | Kitahara et al. | 360/99.06 |
| 4,797,761 | 1/1989 | Cocco | 360/99.06 |
| 4,815,795 | 3/1989 | Accumanno et al. | 211/40 |
| 4,819,802 | 4/1989 | Gutierrez | 312/9.57 |
| 4,833,553 | 5/1989 | Noda et al. | 360/99.06 |
| 4,835,638 | 5/1989 | Takeda | 360/99.02 |
| 4,844,564 | 7/1989 | Price, Sr. et al. | 312/9.63 |
| 4,878,139 | 10/1989 | Hasegawa et al. | 360/99.02 |
| 5,128,923 | 7/1992 | Hasegawa et al. | 360/128 |
| 5,191,983 | 3/1993 | Hardy | 211/40 |
| 5,222,005 | 6/1993 | Inoue | 360/99.06 |

Primary Examiner—Robert S. Tupper
Assistant Examiner—Craig A. Renner
Attorney, Agent, or Firm—Andrus, Sceales, Starke & Sawall

[57] ABSTRACT

A loading mechanism loads a recording medium in response to an inserting operation of the recording medium where the loading mechanism shifts the recording medium from an inserting/ejecting position to a loaded position where data can be recorded on the recording medium and the data can be reproduced from the recording medium. An ejecting mechanism ejects the recording medium in response to a pushing operation of the recording medium located in the loaded position as wherein the ejecting mechanism causes the recording medium to return to the inserting/ejecting position.

10 Claims, 25 Drawing Sheets

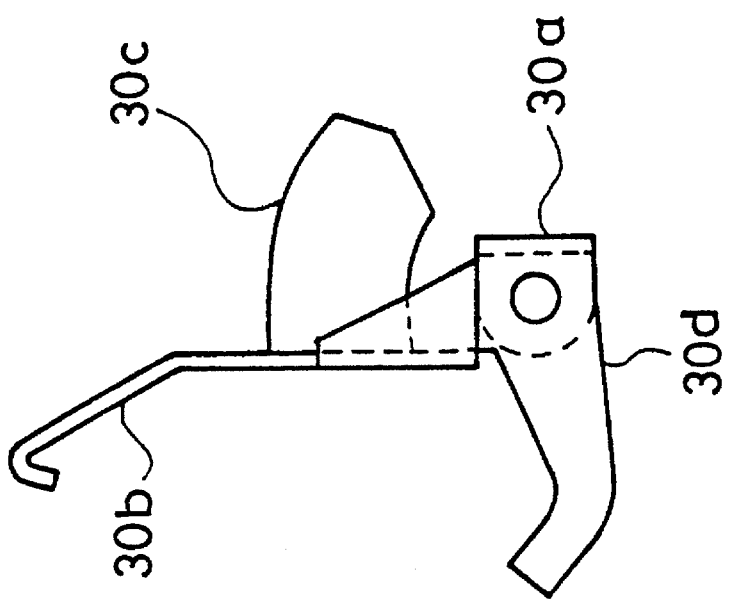

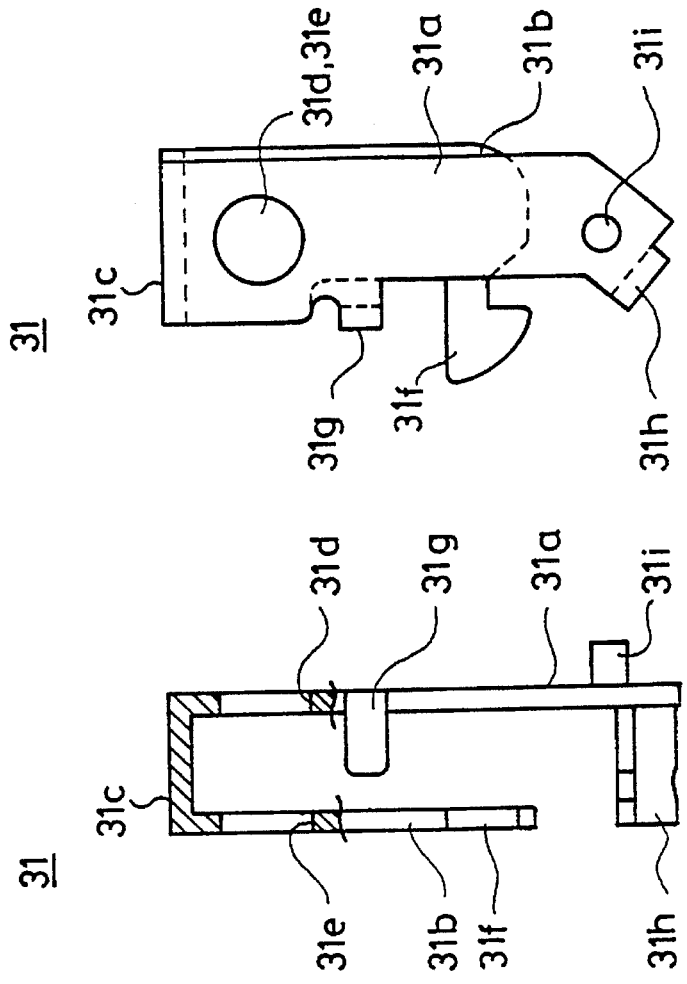

DEVICE FOR LOADING AND EJECTING RECORDING MEDIUM REQUIRING PUSHING OF RECORDING MEDIUM FOR EJECTING THE MEDIUM

This application is a continuation application of Ser. No. 07/992,545 filed Dec. 17, 1992, now abandoned.

BACKGROUND OF THE INVENTION

The present invention relates to a device for loading a recording medium.

An example of the above-mentioned device for loading a recording medium is that used in a magnetic disc apparatus for recording data on a magnetic disc and reproducing data recorded on a flexible magnetic disc, the magnetic disc being originally contained in a disc containing case (such a case will be referred to as a containing case hereinafter), the containing case being loaded in the disc magnetic apparatus prior to the data recording and/or reproducing. The magnetic disc apparatus employs a loading device for loading the containing case into the magnetic disc apparatus. The loading device comprises a holder for holding the containing case after the containing case has been inserted therein; and a slider for sliding as a result of the slider being driven by the elastic force of an elastic member, the elastic member being released from engagement by a latch lever in response to the containing case being inserted. The slider is located between the holder and a frame supporting a turntable rotatably, such that the slider can freely slide therebetween. The direction along which the slider can slide is determined by a guide pin, the guide pin being attached to the frame. The turntable is a part of the magnetic disc apparatus, which turntable rotates the magnetic disc when data is recorded on the magnetic disc and data recorded on the magnetic disc is reproduced. A covering member is attached to the top of the frame, the covering member covering the top of the holder. Further, a shielding cover is attached so as to cover the top, both side and back of the covering member and thus the shielding cover prevents the entry of an external magnetic field.

Such a conventional magnetic disc apparatus has a front panel with an inserting opening for inserting the containing case therethrough; an ejecting button for ejecting the containing case as a result of operating the button; and a lens for an LED (light emitting diode) emitting light during a data recording/reproducing process. The inserting opening, ejecting button, and the lens, particularly the ejecting button may impede the miniaturization and height reducing of the magnetic disc apparatus.

It may be possible to miniaturize the ejecting button so as to miniaturize and reduce the height of the front panel. However, the miniature ejecting button may be difficult to operate.

Further, a method for ejecting the containing case, by means of the ejecting button, may cause a problem when the ejecting button is operated by an operator's finger, the problem occurring because the ejecting button is normally located under the inserting opening, thus the containing case collides with the edge of the operator's finger, which case emerges with force from the inserting opening.

SUMMARY OF THE INVENTION

A first object of the present invention is to provide a device for loading a recording medium, wherein the ejecting operation of the recording medium is easy and it is possible to miniaturize a front part of the apparatus including the device for loading the recording medium.

To achieve the first object, the device according to the present invention comprises:

loading means for loading the recording medium in response to an inserting operation of the recording medium wherein the loading means shifts the recording medium from an inserting/ejecting position to a loaded position where data can be recorded on the recording medium and the data can be reproduced from the recording medium; and ejecting means for ejecting the recording medium in response to a pushing operation of the recording medium located in said loaded position wherein the ejecting means causes the recording medium to return to said inserting/ejecting position.

By the above-mentioned construction, an ejecting button is not needed, and the recording medium can be ejected by pushing itself.

A second object of the present invention is to provide a device for loading a recording medium, wherein relatively small force is sufficient for an ejecting operation.

To achieve the second object, the device according to the present invention comprises:

a holder in which the recording medium is inserted;

a moving member for moving said holder between a recording/reproducing position and a non-recording/reproducing position in response to one of an inserting operation and an ejecting operation;

an elastic member for pushing said moving member in an ejecting direction;

an engagement member for locking said elastic member in an elastically deformed state when said holder is located in the recording/reproducing position; and an engagement releasing member for shifting said engagement member to an engagement releasing position so as to release the locking of said elastic member so that, the elastic force of said elastic member is applied to said moving member.

By the above-mentioned construction, the ejection of the recording medium is initiated by the shifting of the engagement member to an engagement releasing position. The force needed for the shifting is relatively small.

A third object of the present invention is to provide a device for loading a recording medium, wherein an erroneous insertion of the recording medium can be prevented.

To achieve the third object, the device according to the present invention comprises:

a holder in which the recording medium is inserted;

pins protruding in sideways directions from both sides of said holder;

guiding portions which said pins fit so that said guiding portions guide the movement of said holder;

a force applying member for applying a force to said holder so that said pins are pushed to ejecting sides of said guiding portions.

By the above-mentioned construction, the force applying member pushing the pins results in the operator noticing the erroneous insertion.

A fourth object of the present invention is to provide a locking mechanism, wherein repeated pushing operations cause the locking mechanism to have one of a locked state and a released state.

To achieve the fourth object, the locking mechanism according to the present invention comprises:

a first lever having an engagement portion, said first lever being supported pivotably;

a second lever supported coaxially with said first lever;

a force applying member for applying forces to said first and second levers so as to rotate them in opposite directions from each other;

a latch lever to which a force is applied so as to hold it in a latching position before a pushing operation is executed, wherein said latch lever rotates due to said pushing operation, and said latch lever then causes said second lever to rotate against the force applied by said force applying member;

an engagement member for locking said engaging portion of said first lever when said pushing operation is executed, said engagement member releasing the locking of said engagement portion of said first lever when said pushing operation is again executed; and a moving member for moving, as result of said first lever rotating due to the force applied by said force applying member, to a position where said moving member is latched by said latch lever, said rotating of said first lever being caused by the release of the locking of said engagement member.

Other objects and further features of the present invention will become more apparent from the following detailed description when read in conjunction with the accompanying drawings.

BRIEF DESCRIPTION OF THE DRAWINGS

FIGS. 9A, 9B and 9C show a top view, a side view and a bottom view of a latch lever of the ejecting mechanism shown in FIG. 8;

FIGS. 10A, 10B and 10C show a bottom view, a side view and a top view of first lever of the ejecting mechanism shown in FIG. 8;

DESCRIPTION OF THE PREFERRED EMBODIMENTS

Figure 1:
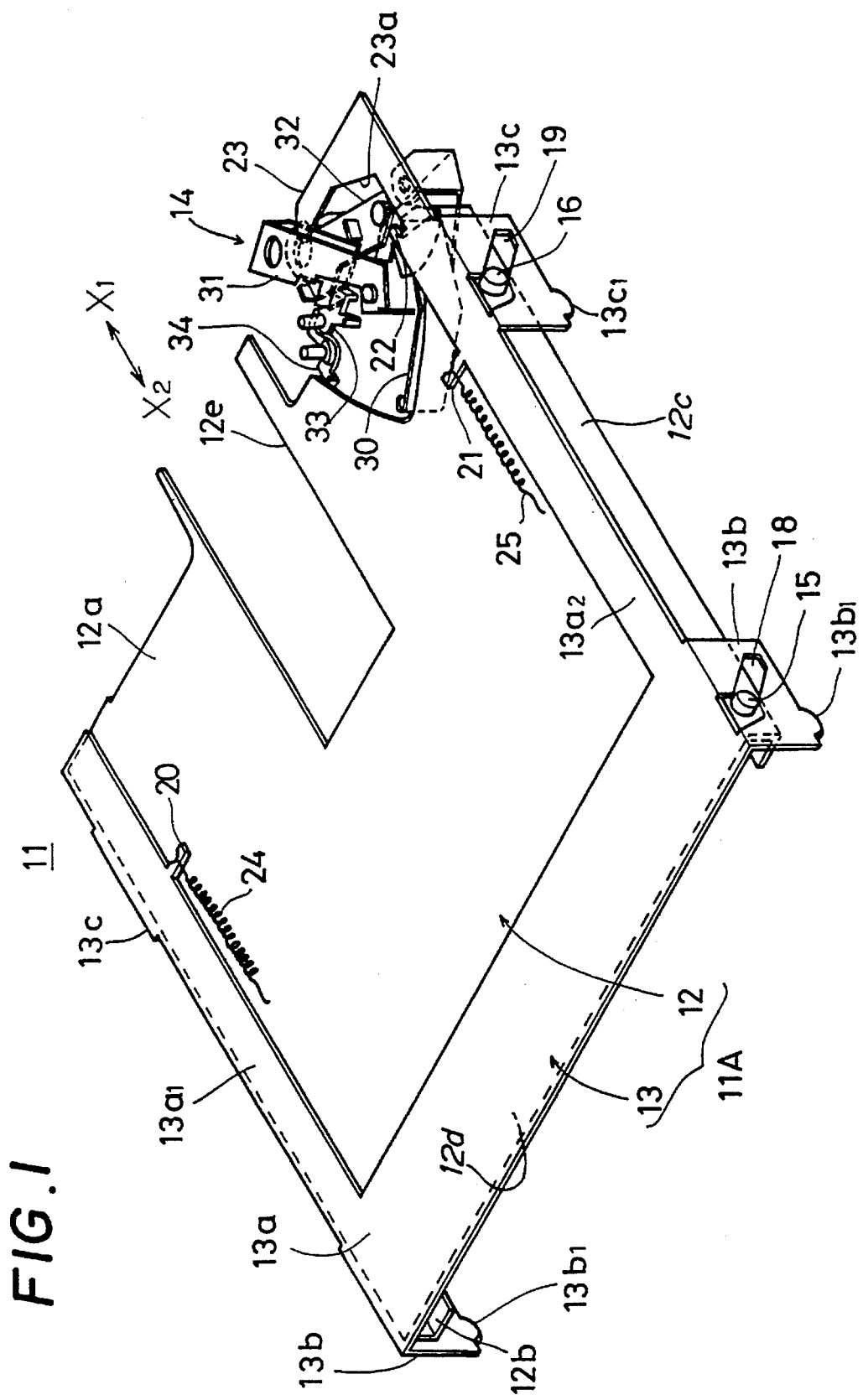
FIG. 1 shows a perspective view of a first embodiment of a device for loading a recording medium according to the present invention.

A magnetic disc apparatus 1 including a first embodiment of a device for loading a recording medium according to the present invention is described below with reference to FIGS. 1, 2 and 3.

In the magnetic disc apparatus 1, a head carriage 3 is attached to a frame 2. The head carriage having a magnetic head (not shown in the drawings), attached on the edge of the head carriage, causes the magnetic head to slide on a flexible magnetic disc when a containing case 4 containing the magnetic disc is loaded in the magnetic disc apparatus. Then, the head carriage 3 causes the magnetic head to move along radial directions ($X_1$ or $X_2$) of the magnetic disc so that the magnetic head magnetically records data on the magnetic disc and/or magnetically reproduces data recorded on the magnetic disc.

A front panel 5 is attached to the front end of the frame 2. An inserting opening 6 for inserting the containing case 4 therethrough as described below is formed in the front panel 5, a lens 7 for indication by LED being attached in the front panel 5. Further, an ejecting button, for ejecting the magnetic disc from the magnetic disc apparatus by operating the ejecting button, is not provided in the front panel 5. Thus, because of eliminating the ejecting button, it is possible to reduce the width along a direction W shown in FIG. 2 and to reduce the height along a direction T shown in FIG. 2 of the front panel 5.

The frame 2 is made by die casting of aluminum alloy. The frame 2 comprises a plane part 2a and side walls 2b and 2c. The head carriage 3 and a turntable (not shown in-the drawings) for rotating the magnetic disc are placed on the plane part 2a. The side walls 2b and 2c stand on either side of the plane part 2a.

A plurality of slots, first, second and third guide slots 8, 9 and 10, are formed in each of the side walls 2b and 2c.

Figure 2:
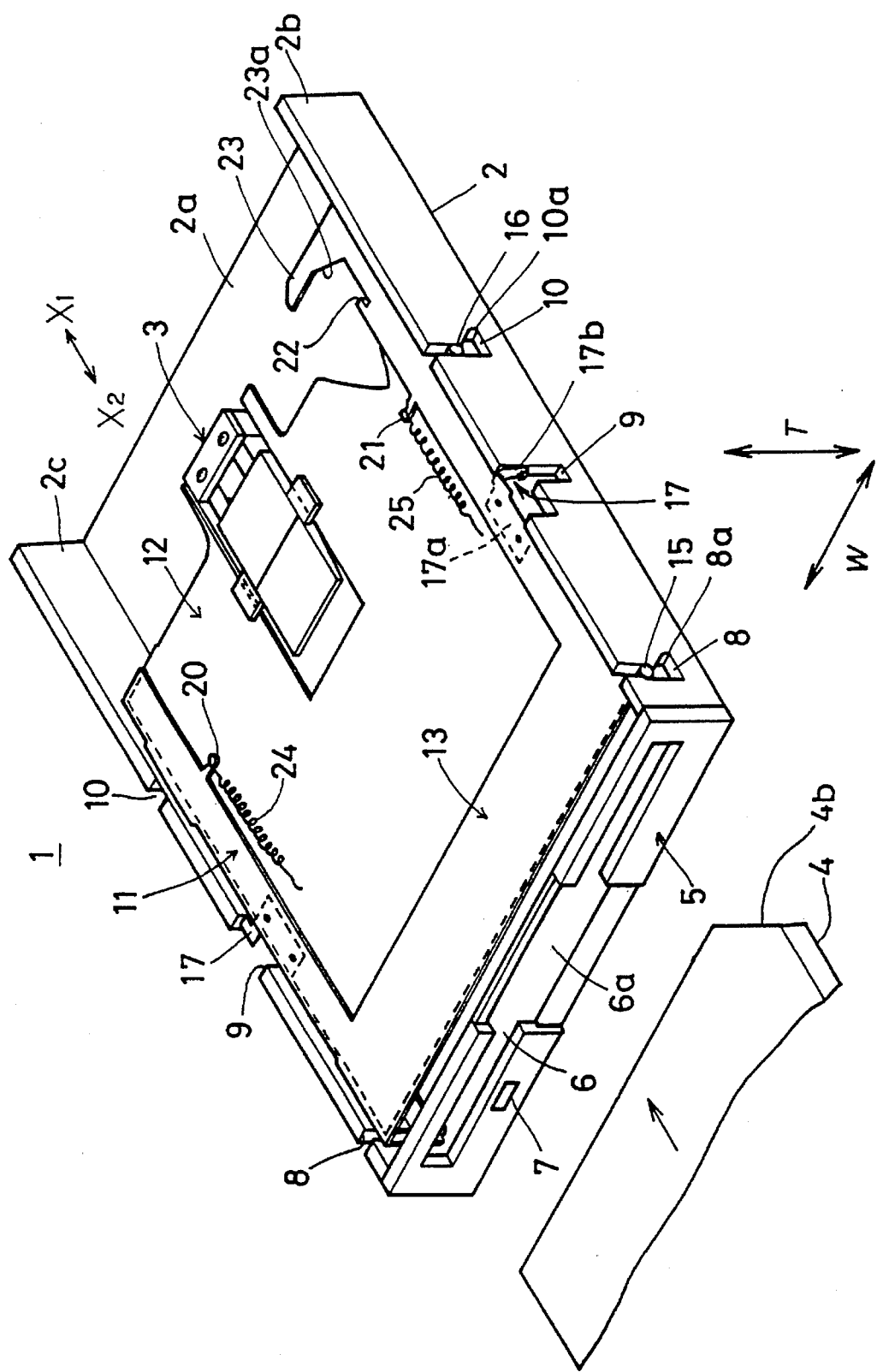
FIG. 2 shows a perspective view of a magnetic disc apparatus in which the device shown in FIG. 1 is included.
Figure 3:
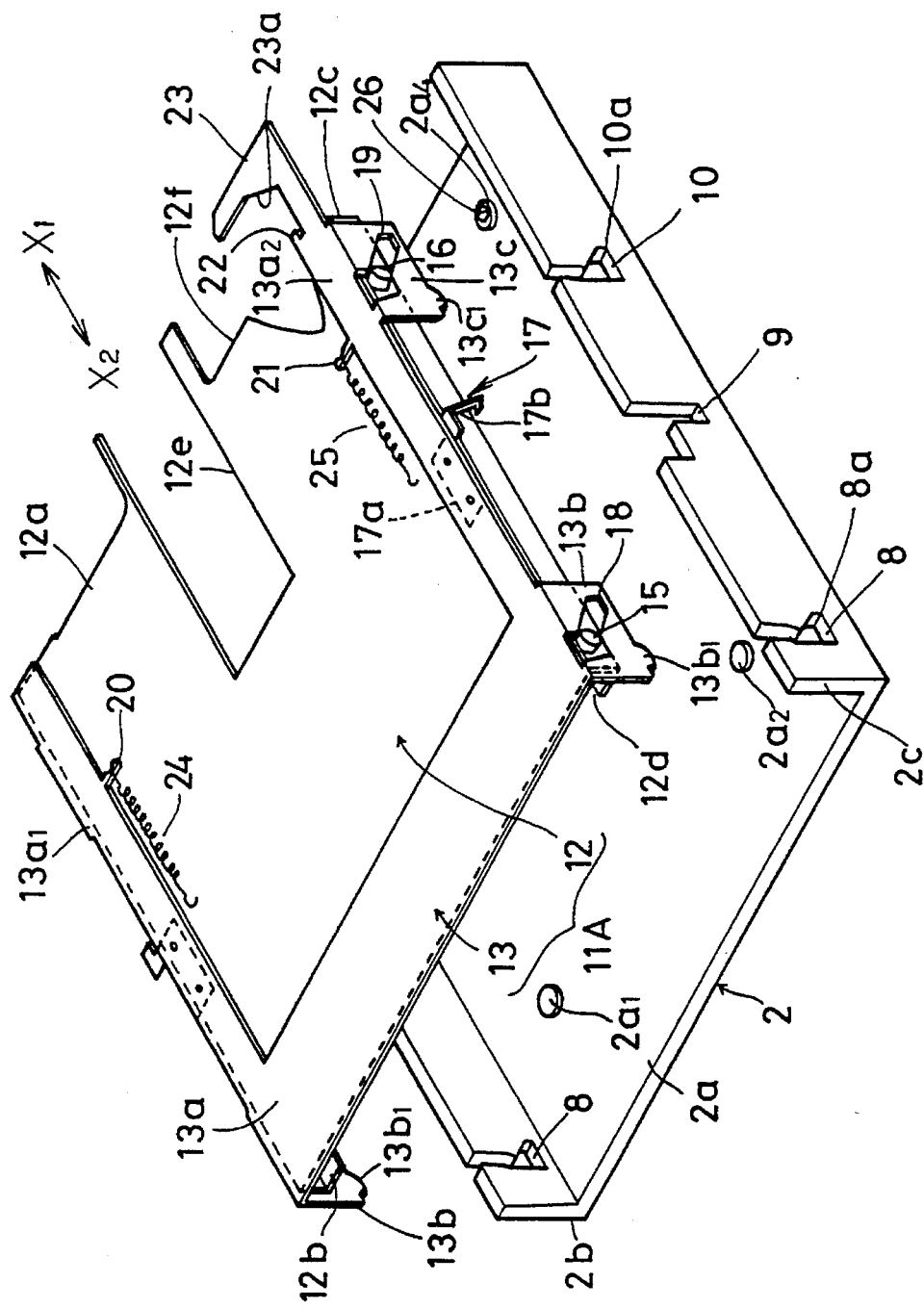
FIG. 3 shows an exploded perspective view of a frame, a slider and a holder, included in the device shown in FIG. 1.
Figure 4:
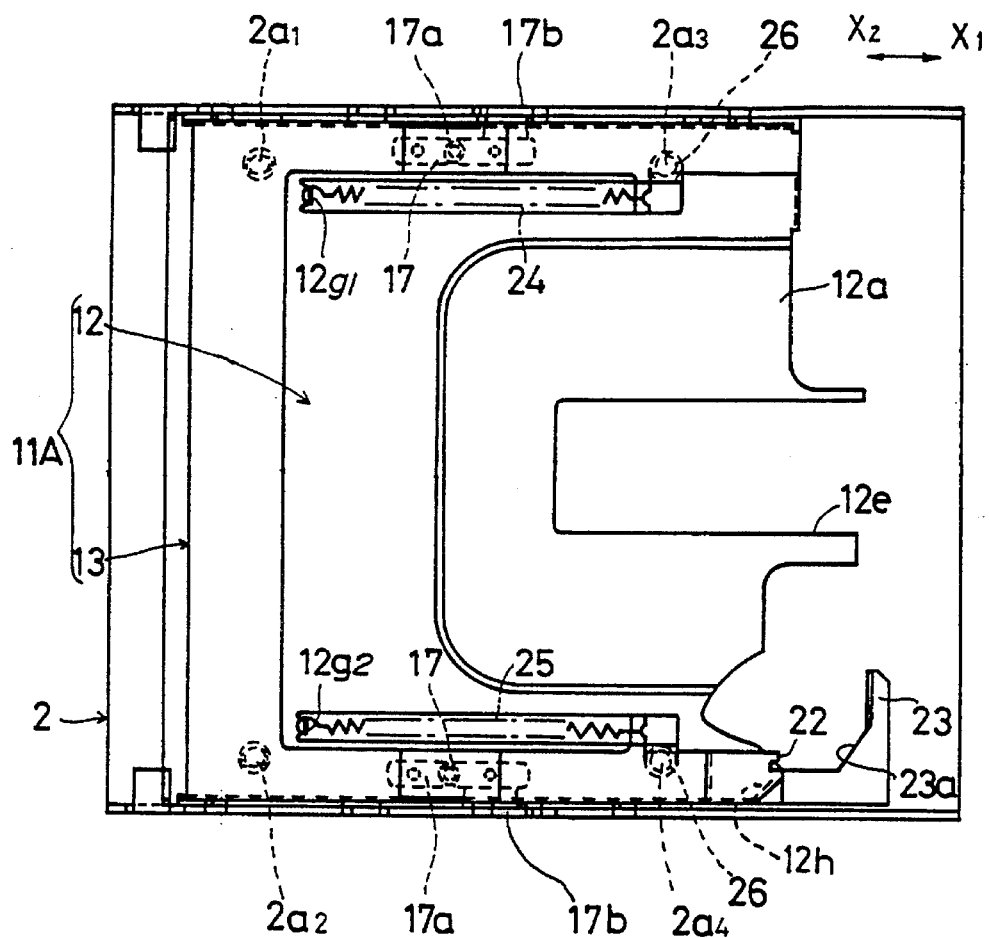
FIG. 4 shows a plan view of the apparatus shown in FIG. 2.

As shown in FIGS. 3 and 4, cylindrical bosses $2a_1$ through $2a_4$ are formed on the top of the plane part 2a. The bosses $2a_1$ through $2a_4$ are used for determining the position, along the height direction T shown in FIG. 2, of the containing case 4 loaded in the magnetic disc apparatus 1.

Figure 6A:
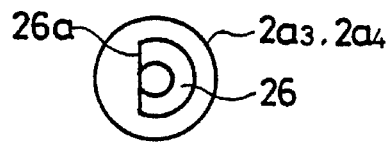
FIGS. 6A and 6B show bosses of the frame shown in FIG. 3, on which a containing case is placed.
Figure 6B:
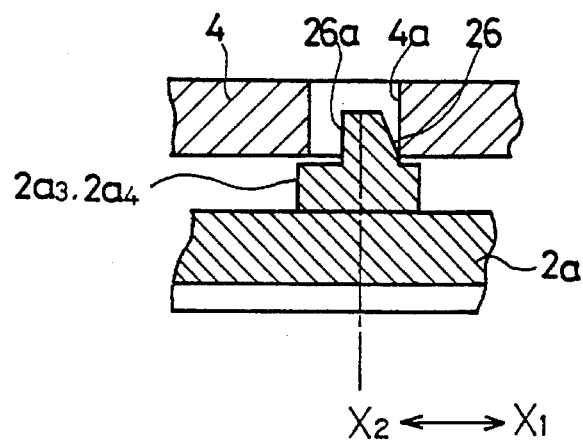

Further, as shown in FIGS. 6A and 6B, each of the back side bosses $2a_2$ and $2a_4$ has a respective protrusion 26 located on the top of the bosses. The protrusions 26 are used for determining a position (the position for recording/reproducing), along forward and backward directions ($X_2$ and $X_1$), of the containing case 4 loaded in the magnetic disc apparatus 1, as a result of the each of the protrusions 26 fitting with respective one of holes 4a formed on the containing case 4. Each of the protrusions has a shape formed as a result of removing a front ($X_2$ direction side) part of a cone, each of the protrusions 26 thus having respective one of wall surfaces 26a on the front side thereof. The shape of the protrusions 26 enables the containing case 4 to move along the $X_1$ direction from a position where the containing case 4 is loaded, when the containing case 4 is ejected as described below.

Further, the above-mentioned guide slots 8 and 10 respectively have triangle-shaped cutout portions (smaller slots) 8a and 10a in lower parts thereof, the cutout parts respectively extending along the $X_1$ direction. These cutout portions 8a and 10a enable below-described protrusion pins 15 and 16 respectively to move along the $X_1$ direction when the containing case 4 is ejected.

Further, the device 11 for loading the containing case 4 in the magnetic disc apparatus 4 is provided to the frame 2. The device 11 has holder 12 into which the containing case 4 is inserted; a slider 13, acting as a moving member, causing the holder 12 to go up or down so as to move between an inserting/ejecting position and a recording/reproducing position; and an ejecting mechanism 14. The ejecting mechanism 14 releases the engagement of the slider 13 as described below as a result of the containing case 4 being inserted; and the ejecting mechanism 14 causes the slider 13 to return, the ejecting mechanism 14 pushing the containing case 4 so as to move it along an ejecting direction in response to the containing case 4 being pushed.

The holder 12 has a top plate 12a and side plates 12b and 12c. Each of the side plates 12b and 12c is made by bending a respective side of the top plate so that a shape, when viewed along the $X_1$ direction, becomes a shape similar to a sharp-cornered letter U. The holder 12 has an inserting space 12d in which the containing case 4 is inserted, the inserting space 12d being defined by the top plate 12a and both side plates 12b and 12c. The holder 12 has a rectangle-shaped opening 12e for entering the head carriage 3 therein; and another opening 12f for entering the ejecting mechanism 14 therein.

Further, each of the side plates 12b and 12c of the holder 12 has a respective one of the above-mentioned protrusion pins 15 and 16. Each of the protrusion pins 15 and 16 extends outside along the side directions W shown in FIG. 2. The protrusion pins 15 and 16 respectively fit the first and third guide slots 8 and 10, the guide slots 8 and 10 being respectively formed in the side walls 2b and 2c of the frame 2. This guides the holder 12 so that the holder 12 can go up or down between the above-mentioned inserting/ejecting position and loaded position (recording/reproducing position).

Leaf springs 17, acting as force applying members, are attached to the holder 12. One of the leaf springs 17 is located in a position between the protrusion pins 15 and 16 both being formed in the side plate 12b of the holder 12; and the other leaf spring 17 is located in a position between the other protrusion pins 15 and 16 formed in the other side plate 12c of the holder 12. The bottom parts 17b of each of the leaf springs 17 attached to respective the side plates 12b and 12c inclines to extend along a line, the angle formed between this line and the direction $X_1$ being less than 90°. The top parts 17a of the leaf springs 17 are fixed on the top plate 12a of the holder 12; and the bottom parts 17b of the leaf springs 17 are free ends and can be elastically deformed so that the bottom ends of the bottom parts 17b can move in the ejecting direction $X_2$.

The slider 13 is located on top of the holder 12 so as to overlap with it. The slider 13 has a top plate 13a having a shape similar to a sharp-cornered letter U when viewed from the top. The slider 13 has a pair of side plates 13b and 13c formed as a result of both the side parts of the top plate 13a being respectively bent downward. Each of the side plates 13b and 13c has a respective one of half-circle-shaped sliding parts $13b_1$ and $13c_1$ at the bottom ends thereof, the sliding parts $13b_1$ and $13c_1$ sliding on the plane part 2a of the frame 2.

Figure 5:
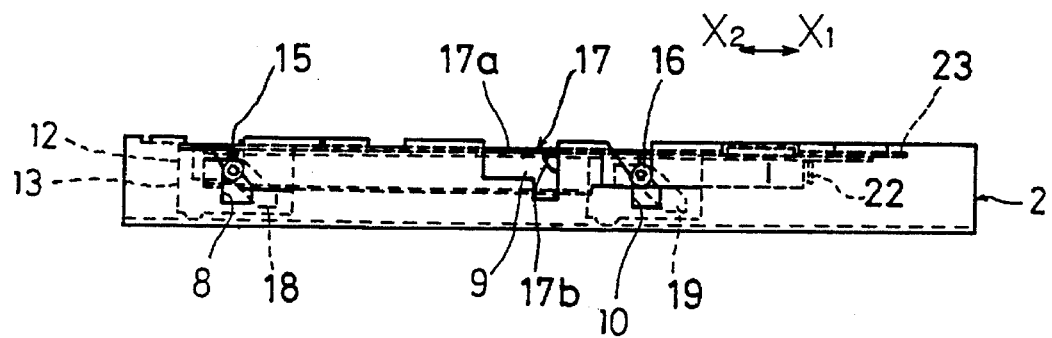
FIG. 5 shows a side view of the apparatus shown in FIG. 2.

Each of the side plates 13b and 13c has a pair of inclined oblong holes 18 and 19, a respective one of the above-mentioned protrusion pins 15 and 16 of the holder 12 passing through each of the inclined oblong holes 18 and 19. The inclined oblong holes 18 and 19 respectively extend along lines, the lines respectively extending from the top-left to the bottom-right as shown in FIG. 5, that is, moving to a lower point on the lines means moving also in the disc-inserting ($X_1$) direction. Thus, the slider 13 sliding in the $X_2$ direction causes the protrusion pins 15 and 16, respectively passing through the inclined oblong holes 18 and 19, to move downwards relative to the slider 13 so that the holder 12 goes down toward the loaded position. The loaded position is a position of the slider 12 where the containing case 4 held by the holder 12 is located such that the above-mentioned magnetic head can record data on the magnetic disc contained in the containing case 4, and can reproduce data recorded on the magnetic disc. When the protrusion pins 15 and 16 go down as mentioned above, pushing forces due to the above-mentioned leaf springs 17 help the protrusion pins 15 and 16 to respectively contact the front ($X_2$ direction)-vertical walls of the guide slots 8 and 10, the protrusion pins 15 and 16 moving downwards thus sliding along the front-vertical walls.

Further, the slider 13 has both arm portions $13a_1$ and $13a_2$ respectively extending toward the $X_1$ direction, the arm portions $13a_1$ and $13a_2$ being parts of the top plate 13a. Each of the arm portions $13a_1$ and $13a_2$ has a respective one of spring-engagement portions 20 and 21 inside of the arm portion. The arm portion $13a_2$, on the right when viewed from the top, further has an engagement portion 22 and a hook 23, both located at the end section of the arm portion $13a_2$. The engagement portion 22 extends downward as shown in FIG. 5. The hook 23 has a shape similar to the letter L.

The hook 23 has an inclined cam 23a, the inclined cam 23a being located inside the corner of the hook 23. When the containing case 4 is ejected from the magnetic disc apparatus 1, a below-described contacting pin 31i of a first lever 31 of the ejecting mechanism contacts the above-mentioned inclined cam 23a, while the first lever 31 rotates. Then, the contacting pin 31i pushing the inclined cam 23a of the slider 13 enables minimization of the rotating angle of the first lever 31 without varying the stroke of the slider 13. As a result, an elastic force of a torsion spring 36, acting as an elastic member or acting as a force applying member, may be reduced, the elastic force being applied to the first lever 31 so that the first lever 31 rotates as mentioned above. Thus, damaging of the torsion spring 36 can be prevented, the damaging occurring as a result of too much elastic deformation o the torsion spring 36, the deformation being needed in order to apply an appropriate elastic force to the lever 31.

Further, the inclined cam 23a enables a reduction of the clearance between the first lever 31 and the slider 13. As a result, play in the ejecting action, by which the containing case 4 is ejected from the magnetic disc apparatus 1, can be reduced. Thus, the ejecting action can be carried out smoothly.

Further, the right-side side plate 12c of the holder 12 has an inclined surface 12h as shown in FIG. 4. The inclined surface 12h prevents an erroneous insertion of the containing case 4 into the magnetic disc apparatus 1, the erroneous insertion being such that the containing case 4 is inserted in an erroneous orientation.

The inclined surface 12h is made so as to fit a chamfered portion 4b, as shown in FIG. 2, of the containing case 4, the chamfered portion 4b being formed on the front-end and right-side corner of the containing case 4. Thus, a correct insertion of the containing case 4 into the holder 12 allows the containing case 4 to be inserted so that the chamfered portion 4b fits to the inclined surface 12h.

On the other hand, the incorrect insertion of the containing case 4 prevents the containing case 4 from being inserted sufficiently into the holder 12, as a result of a corner of the containing case 4 other than the corner formed to be the chamfered portion 4b contacting the inclined portion 12h.

The operator further pushing the containing case 4 in the inserting direction ($X_1$), without detecting that; the insertion is incorrect, causes the leaf spring 17 attached on the slider 13 to be elastically deformed so that the holder 12 and slider 13 move in the inserting dissection ($X_1$), this $X_1$ directional motion of the holder 13 being allowed because the cutout portions 8a and 10a of the guide slots 8 and 10 provide the appropriate clearances required for the relevant motion of the pins 15 and 16 therein.

The above motion of the slider 13 increases the elastic forces of the leaf springs 17, these elastic forces being applied to the containing case 4. Thus, the operator has to push the containing case 4 by a relatively strong pushing force so as to overcome the above-mentioned elastic forces so as to move the containing case 4 in the inserting direction. This relative strong pushing force causes the operator to notice that this inserting is incorrect. Consequently, the erroneous-direction inserting may be prevented.

One end of each of both coil springs 24 and 25 shown in FIG. 2 is hooked onto a respective one of the above-mentioned spring-engagement portions 20 and 21. The other end of each of the coil springs 24 and 25 is hooked to respective one of engagement portion $12g_1$ and $12g_2$ both being provided to the holder 12, the holder 12 being placed on the slider 13. Tension forces of these coil springs 24 and 25 act on the slider 13 so as to pull the slider 13 in the $X_2$ direction. The holder 12 and slider 13 having constructions as mentioned above constitute a moving mechanism 11A. The moving mechanism moving the containing case 4 with the holder 12.

A construction of the above-mentioned ejecting mechanism 14 is described below with reference to FIGS. 7 through 13.

Figure 7:
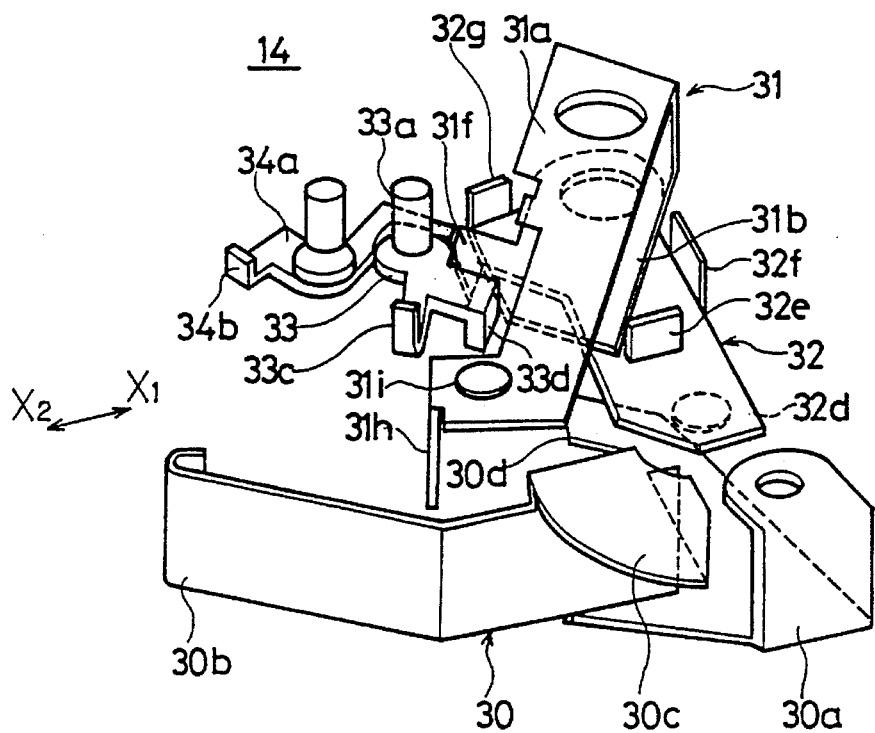
FIG. 7 shows a perspective view of an ejecting mechanism employed in the device shown in FIG. 1.
Figure 8:
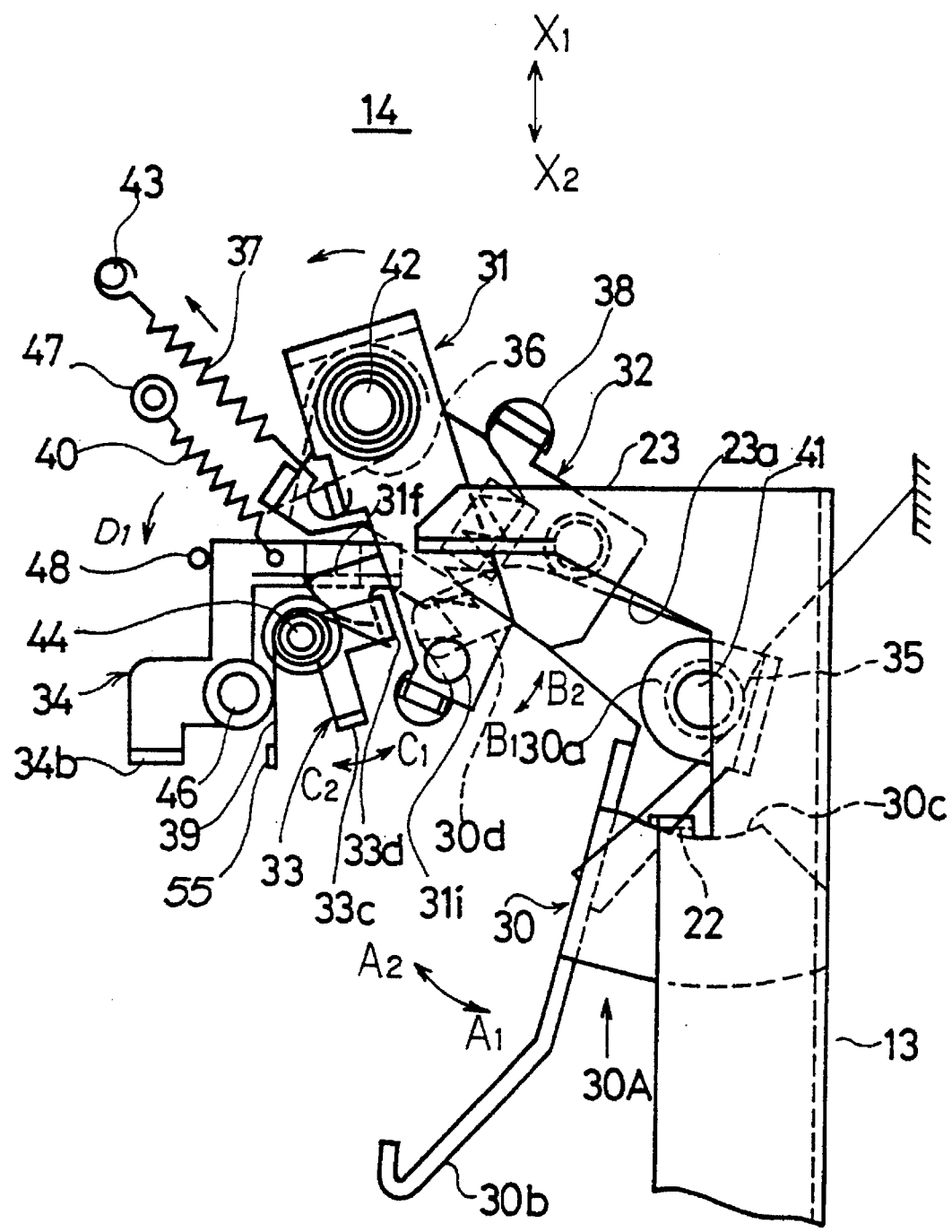
FIG. 8 shows a plan view of the ejecting mechanism shown in FIG. 7 before the containing case is inserted.

As shown in FIGS. 7 and 8, generally, the ejecting mechanism 14 has latch lever 30, first through fourth levers 31 through 34, and springs 35 through 40. The front end of the containing case 4 (the containing case 4 is inserted into the magnetic disc apparatus 1 from the front end) contacts the latch lever 30. Each of the springs 35 through 40 acts on a respective one of the first through fourth levers 31 through 34.

The latch lever 30 has, as shown in FIGS. 9A through 9C, a bearing portion 30a, a contacting portion 30b, a latch portion 30c and a nail portion 30d. The bearing portion 30a has a shape similar to the letter U, the corners of a letter U being sharp, when viewed from the bottom of FIGS. 9A through 9C. The bearing portion 30a is supported by a shaft of the frame 2. The contacting portion 30b, having a shape similar to a leaf spring, extends from the bearing portion 30a. The latch portion 30c, having a shape similar to an arc, extends from the middle part of the contacting portion 30b. The nail portion 30d extends from the bearing portion 30a, along a direction approximately perpendicular to the contacting portion 30b. Further, an elastic force of a torsion spring 35 shown in FIG. 8 acts on the latch lever 30 so as to rotate it in a direction $A_1$, the torsion spring 35 being wound on a shaft 41 located on the frame 2.

The top edge of the contacting portion 30b, as shown in FIGS. 9A through 9C, is bent so that the outer surface has a curved shape. The curved shape of the contacting portion 30b, contacting the front end of the containing case 4, prevents the contacting portion 30b from damaging the front end of the containing case 4. The latch portion 30c, as shown in FIG. 8, engaging the above-mentioned engagement portion 22 of the slider. 13, thus prevents the slider 13 from sliding in the $X_2$ direction. The latch lever 30 and the torsion spring 35 constitute a returning mechanism 30A. In the returning mechanism 30A, when the containing case 4 is ejected from the magnetic disc apparatus 1, the contacting portion 30b acts on containing case 4 so as to return it in the ejecting direction to the nonrecording/reproducing position (inserting/ejecting position).

The parts respectively shown in FIGS. 10A through 13B may be shown in different orientations to the normal ones of FIG. 7, so that the names "top", "bottom", "right" and "left" may not correspond to their locations in FIGS. 10A through 13B.

A construction of the first lever 31 is described below with reference to FIGS. 10A through 10C. The first lever 31 has a top plate 31a, a bottom plate 31b, and a vertical plate 31c, these top and bottom plates 31a and 31b being parallel to each other, the vertical plate 31c coupling the top and bottom plates 31a and 31b together. These plates 31a, 31b and 31c form a shape similar to the letter U, each corner of the letter U being sharpened, as shown in FIG. 10B, when viewed from the right side in FIG. 7. A respective one of holes 31d and 31e is formed in each of the top and bottom plates 31a and 31b near the vertical plate 31c, a shaft 42 located on the frame 2 being fitted in the holes 31d and 31e. An engagement nail 31f, having a hook shape, is formed on the side of the end part of the bottom plate 31b. Further, first and second engagement portions 31g and 31h respectively extend leftwards as shown in FIG. 10B from the respective sides of and the bottom end, in FIG. 10B, of the top plate 31a.

Further, a contacting pin 31i protrudes rightwards, in FIG. 10B, from the right side of the surface of the top plate 31a, the contacting pin 31i contacting the hook 23 of the slider 13.

As shown in FIG. 8, the torsion spring 36 is wound on the shaft 42, the end of the torsion spring 36 contacting the first engagement portion 31g. Further, a coil spring 37 acts on the first lever 31 so as to pull it in the $B_1$ rotating direction, one end of the coil spring 37 being hooked to the pin 43 located on the frame 2, and the other end of the coil spring 37 being hooked to the first engagement portion 31g.

Figure 11A:
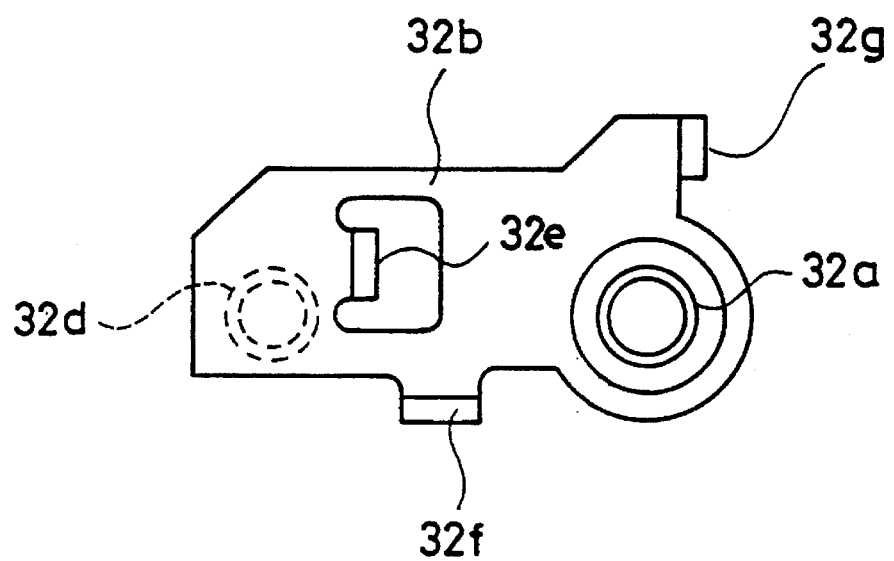
FIGS. 11A and 11B show a top view and a side view of a second lever of the ejecting mechanism shown in FIG. 8.
Figure 11B:
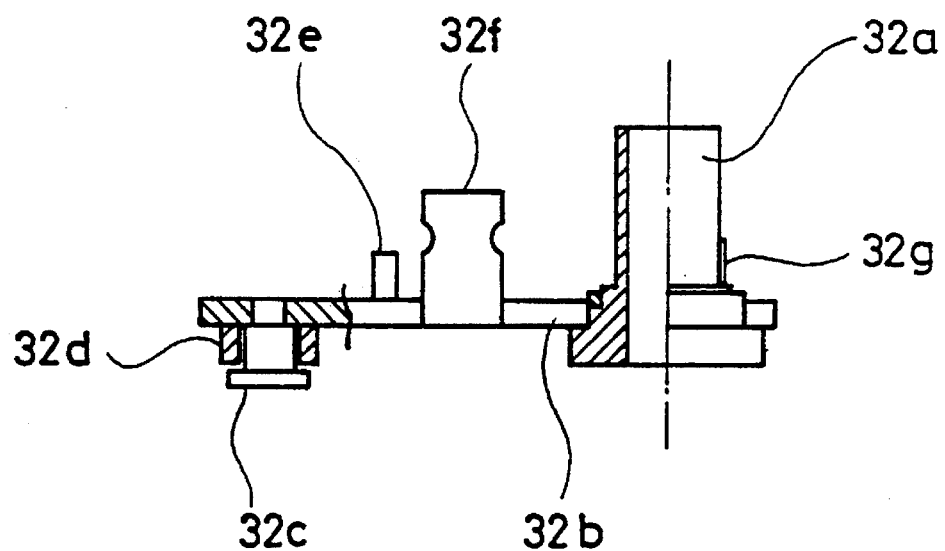

The construction of the second lever 32 is described below with reference to FIG. 11A and 11B. The second lever 32 has a hollow shaft 32a, a base 32b, a roller 32d and protrusions 32e through 32g. The above-mentioned shaft 42 is inserted in the hollow shaft 32a, the shaft 42 thus supporting the hollow shaft 32a pivotably. The hollow shaft 32a is press-fitted into the base 32b from the bottom of the base 32b as shown in FIG. 11B. The roller 32d is provided on a shaft 32c attached to the bottom surface of the base 32b as shown in FIG. 11B. The protrusions 32e, 32f and 32g respectively extend upward from the base 32b.

As shown in FIGS. 7 and 8, the second lever 32 and the first lever 31 are coaxially supported by the common shaft 42 and pivot on it. The first lever 31 overlaps with the second lever 32 so that the first lever 31 is located on the top of the second lever 32.

One end of the torsion spring 36 wound on the shaft 42 contacts the engagement portion 31g of the first lever 31, and the other end of the torsion spring 36 contacts the protrusion 32g of the second lever 32. The torsion spring 36 acts on the first and second lever 31 and 32 so that the first lever 31 is pushed in the $B_2$ rotating direction and the second lever 32 is pushed in the $B_1$ rotating direction. Further, one end of a coil spring 38, acting as an elastic member, is hooked to the engagement portion 31b of the first lever 31 and the other end of the coil spring 38 is hooked to the protrusion 32f of the second lever 32. By this construction, the coil spring 38 pulls both the first and second lever so that the first lever 31 is pulled in the $B_2$ rotating direction and the second lever 32 is pulled in the $B_1$ rotating direction.

Figure 12A:
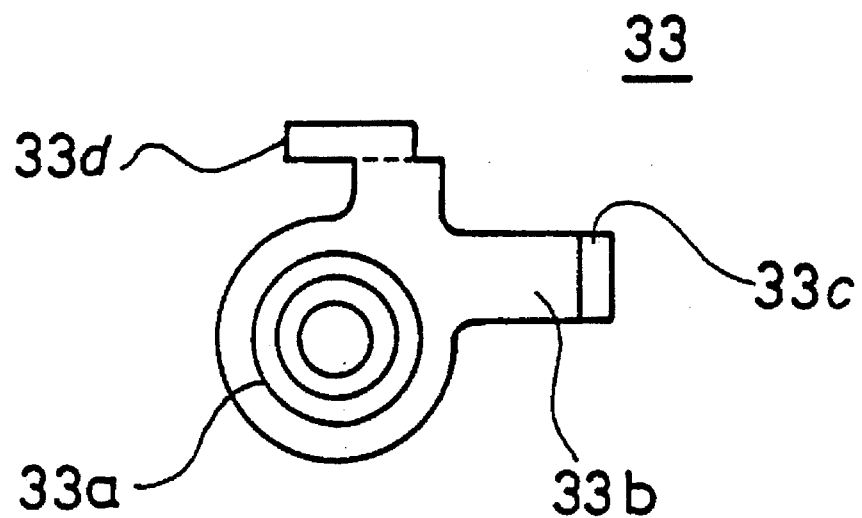
FIGS. 12A and 12B show a top view and a side view of a third lever of the ejecting mechanism shown in FIG. 8.
Figure 12B:
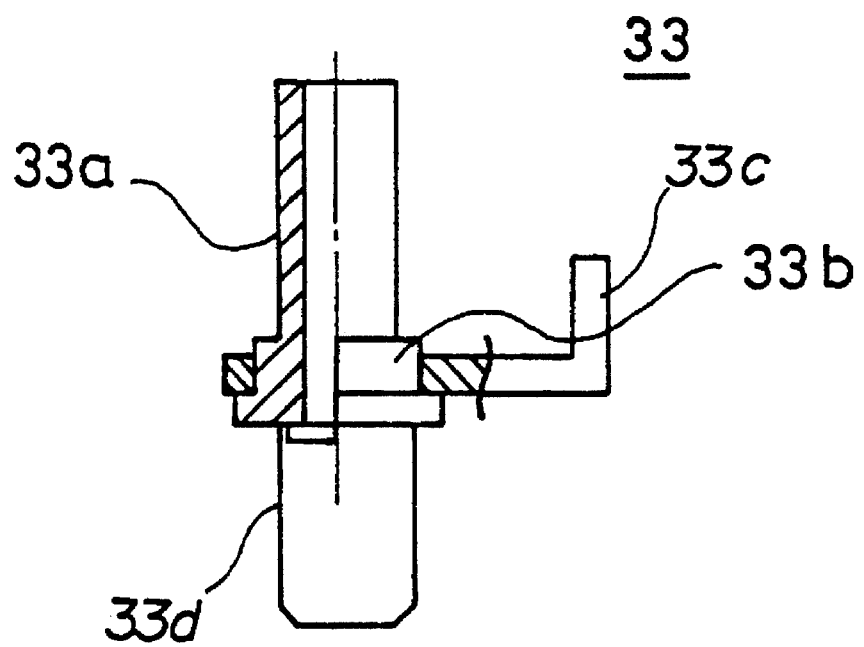

The construction of the third lever 33, acting as an engagement member, is described with reference to FIGS. 12A and 12B. The third lever 33 has a bearing portion 33a, a base 33b, an engagement portion 33c and a protrusion 33d. A shaft 44 located on the frame 2 is inserted in the bearing portion 33a. The base 33b is fixed on the bottom part, in FIG. 12B, of the bearing portion 33a. The engagement portion 33c extends downward, in FIG. 12B, from the base 33b. The protrusion 33d extends upward, from the base 33b.

A torsion spring 39 is wound on the bearing portion 33a of the third lever 33. One end of the torsion spring 39 contacts the protrusion 33d, and the other end of the to torsion spring 39 is hooked onto a protrusion 55 located on the frame 2.

The elastic force of the torsion spring 39 acts on the third lever 33 so that the third lever 33 is pushed in the $C_1$ direction. As a result, the third lever 33 is rotated so that the engagement portion 33c hooks the engagement nail 31f of the first lever 31. The position of the third lever 33 where the engagement portion 33c hooks the engagement nail 31f is called the lock position. In the lock position, the springs 36 and 38 are elastically deformed.

Figure 13B:
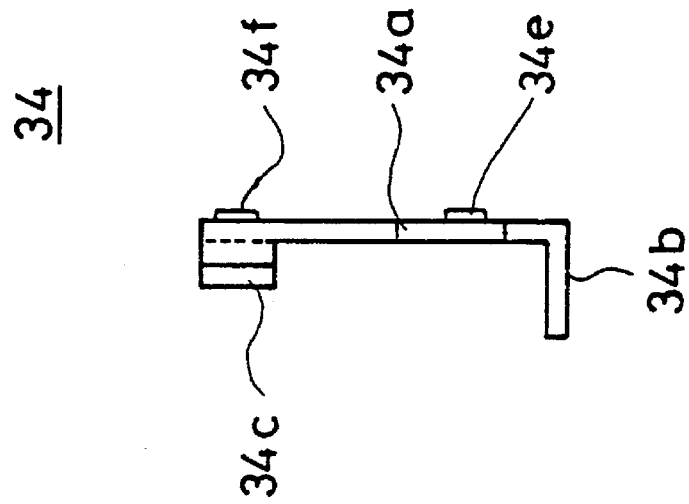
FIGS. 13A and 13B show a top view and a side view of the fourth lever of the ejecting mechanism shown in FIG. 8.
Figure 13A:
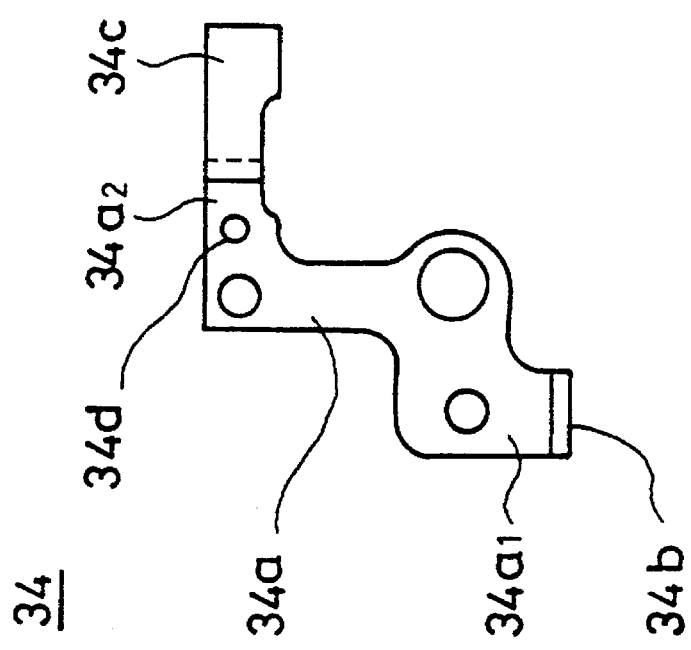

The construction of the fourth lever 34 is described below with reference to FIGS. 13A and 13B. The fourth lever 34 has a base 34a, a contacting portion 34b, contacting portion 34c and a hole 34d. The base 34a is supported by a pin 46 located on the frame 2. The contacting portion 34b extends leftwards, in FIG. 13B, from an arm portion $34a_1$ located at one end of the base 34a. The contacting portion 34c extends from an arm portion $34a_2$ located at the other end of the base 34a. The hole 34d is formed in the middle part of the arm portion $34a_2$. Protrusions 34e and 34f are formed on the right side surface, in FIG. 13B, of the base 34a, the protrusions 34e and 34f sliding on the frame 2.

As shown in FIG. 8, one end of a coil spring 40 is hooked on a pin 47, and another end of the coil spring 40 is hooked in the hole. 34d of the fourth lever 34. The pulling force of the coil spring 40 acts on the fourth lever 34 so that the fourth lever 34 is pulled in the $D_1$ rotating direction. The fourth lever 34 contacts a stopper pin 48 located on the frame 2, thus the fourth lever 34 is kept at the position where the fourth lever 34 contacts the stopper pin 48, as shown in FIG. 8. Further, the contacting portion 34c of the fourth lever 34 comes near the engagement portion 33d of the third lever 33.

Actions of the loading device having the above-mentioned construction are described below.

Figure 14:
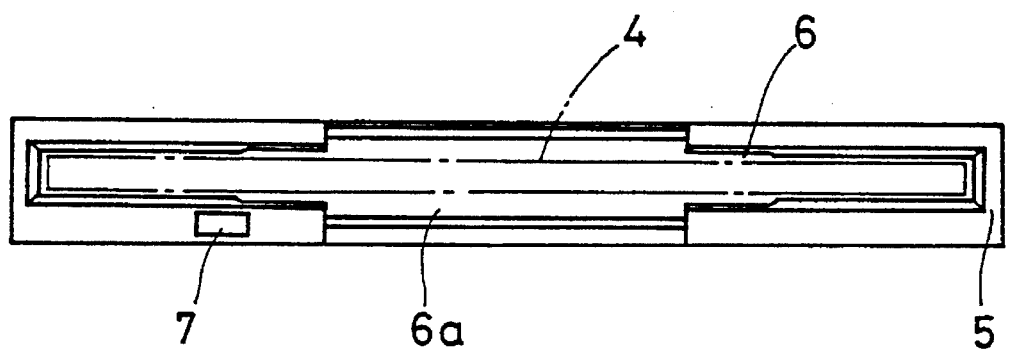
FIG. 14 shows a front view of the apparatus shown in FIG. 2 in a condition where the containing case is being inserted.

As shown in FIGS. 2 and 14, the front panel 5 has the inserting opening 6 for inserting the containing case 4 therein. The inserting opening 6 has an opening 6a in the middle thereof, the opening 6a having the longer height along the direction T than those of both the side parts of the inserting opening 6.

Figure 15:
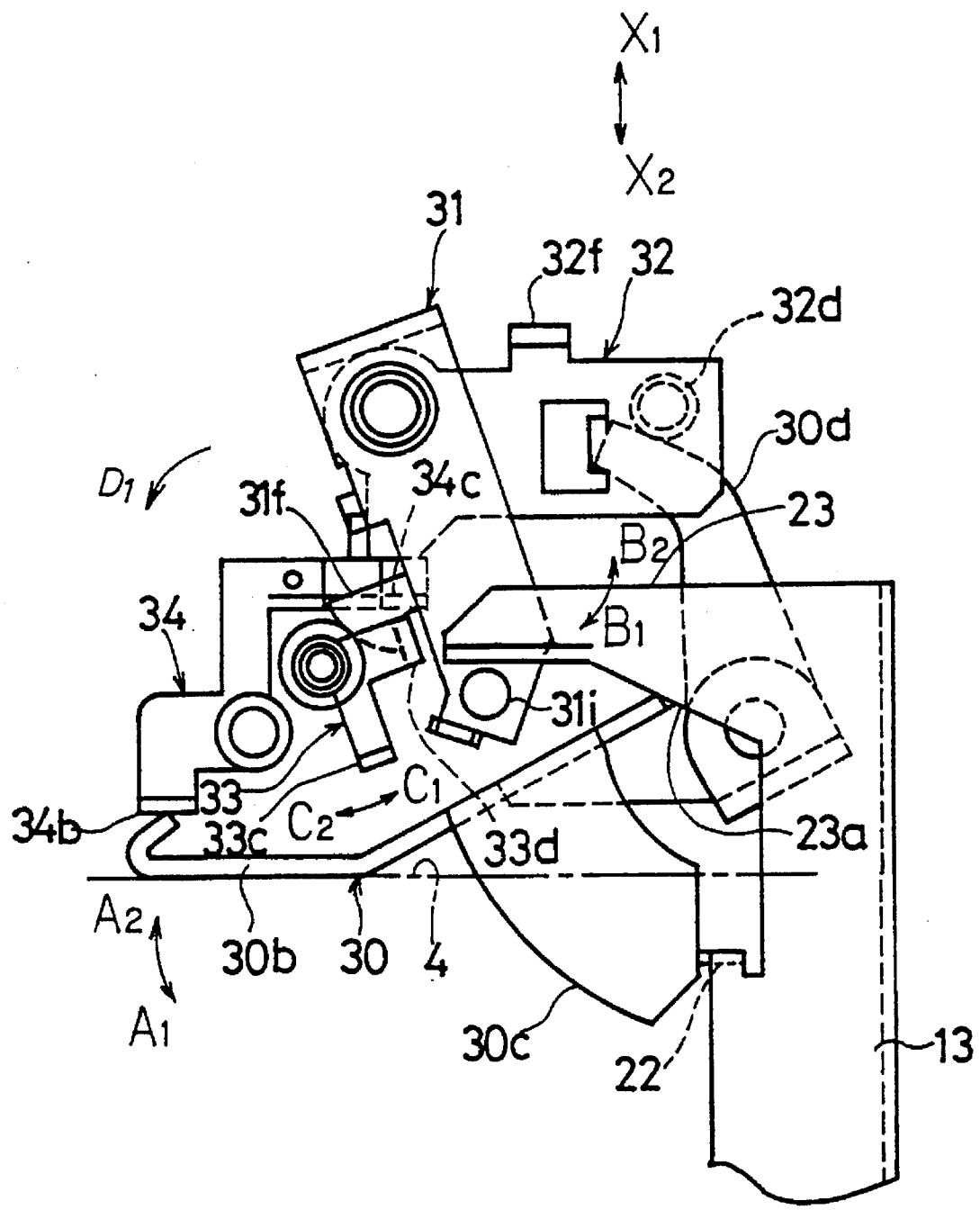
FIG. 15 shows a plan view of the ejecting mechanism shown in FIG. 8 in a condition where the containing case has been inserted.
Figure 17:
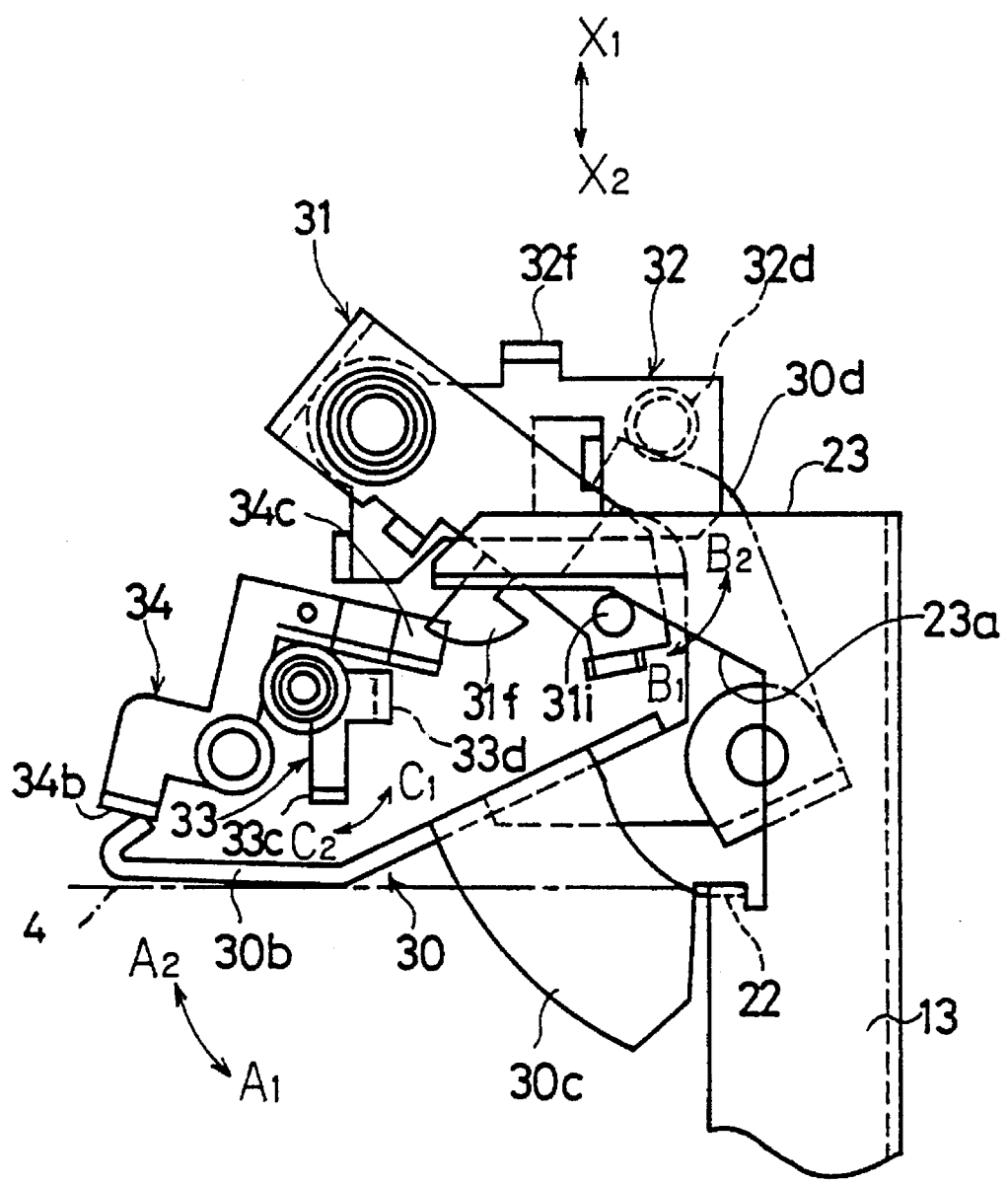
FIG. 17 shows a plan view of the ejecting mechanism shown in FIG. 15 in a condition where the containing case is being ejected.
Figure 18:
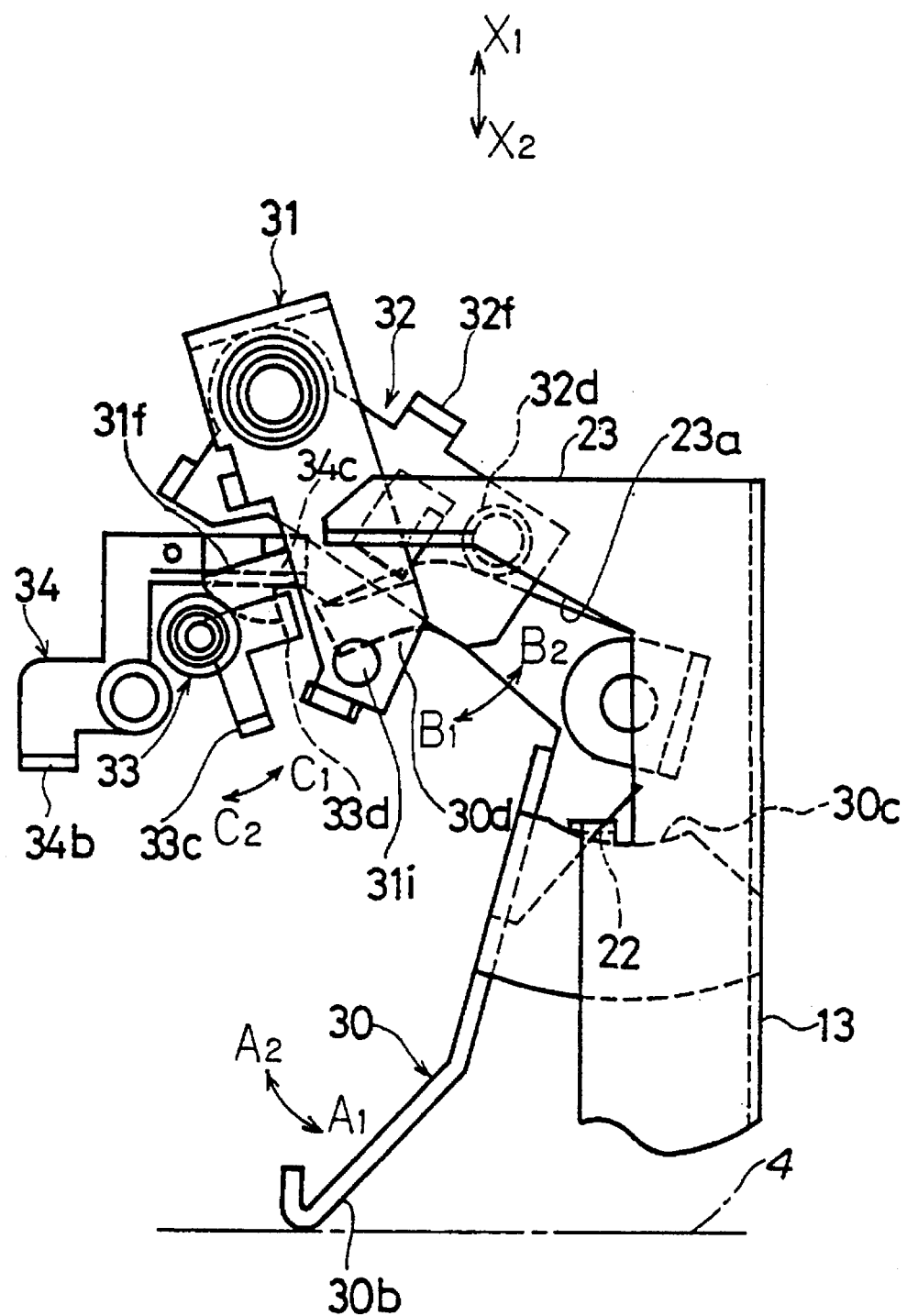
FIG. 18 shows a plan view of the ejecting mechanism shown in FIG. 15 in a condition where the containing case has been ejected.
Figure 19:
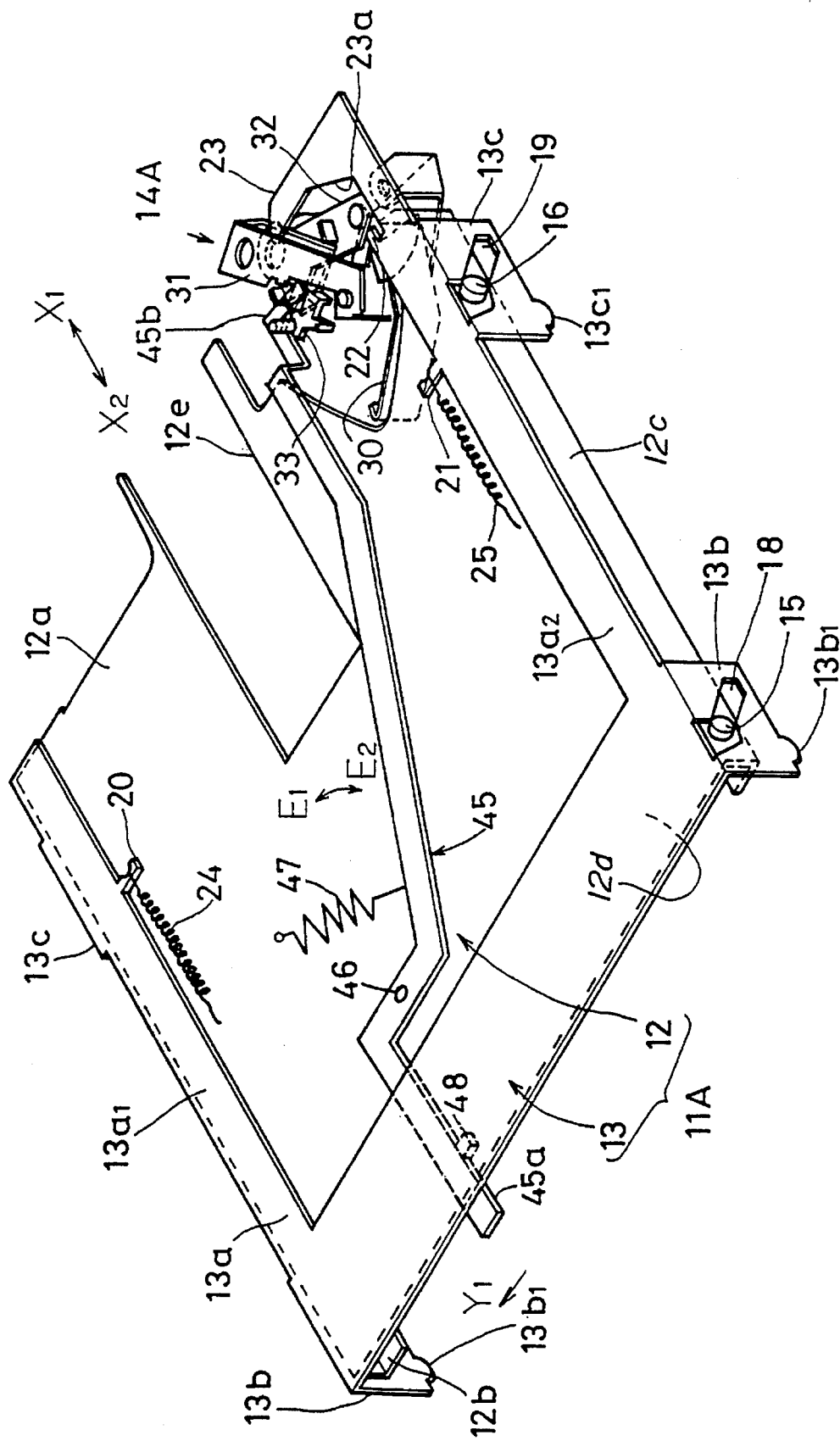
FIG. 19 shows a perspective view of a second embodiment of a device for loading a recording medium according to the present invention.
Figure 20:
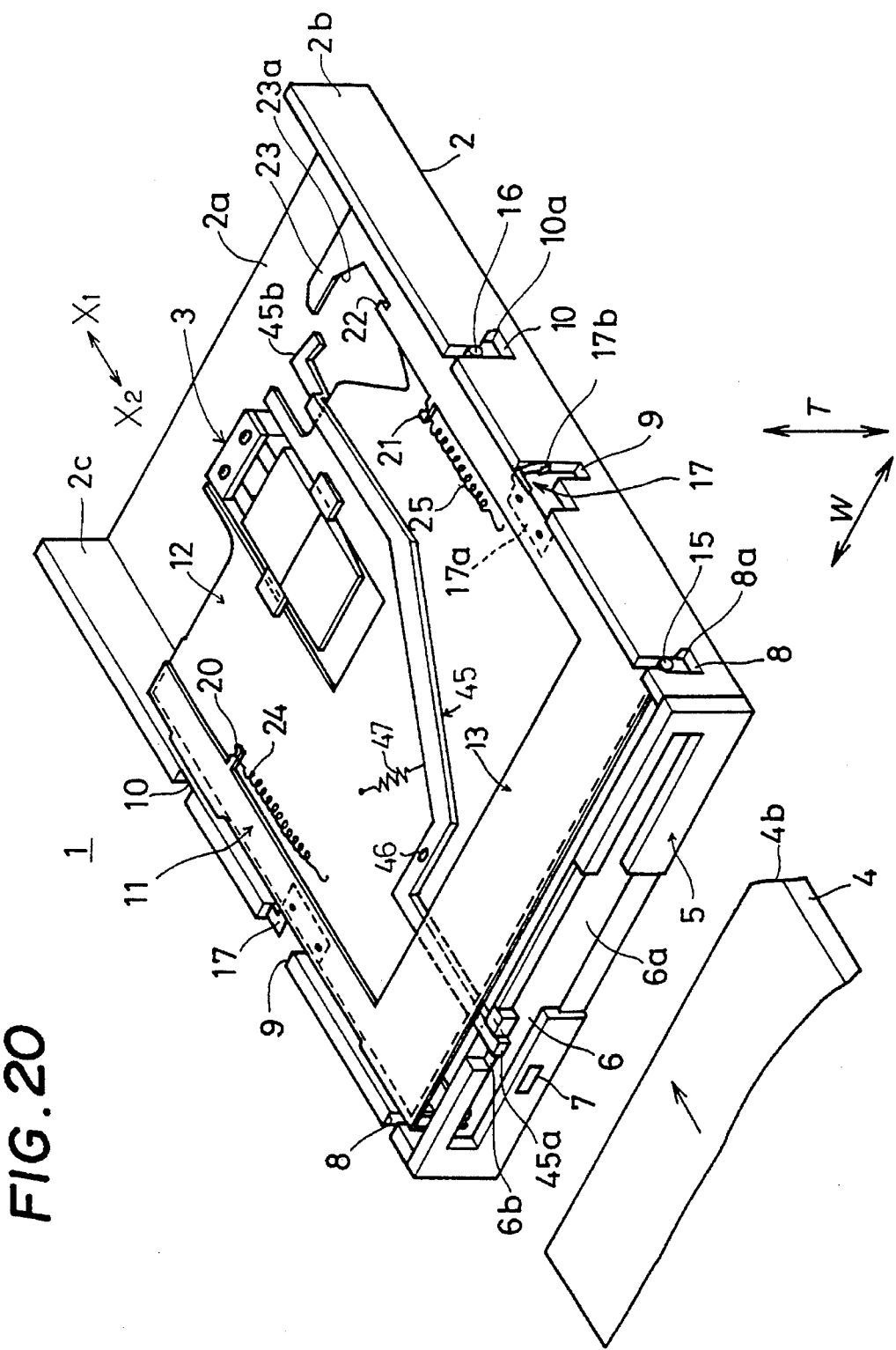
FIG. 20 shows a perspective view of a magnetic disc apparatus in which the device shown in FIG. 19 is included.
Figure 21:
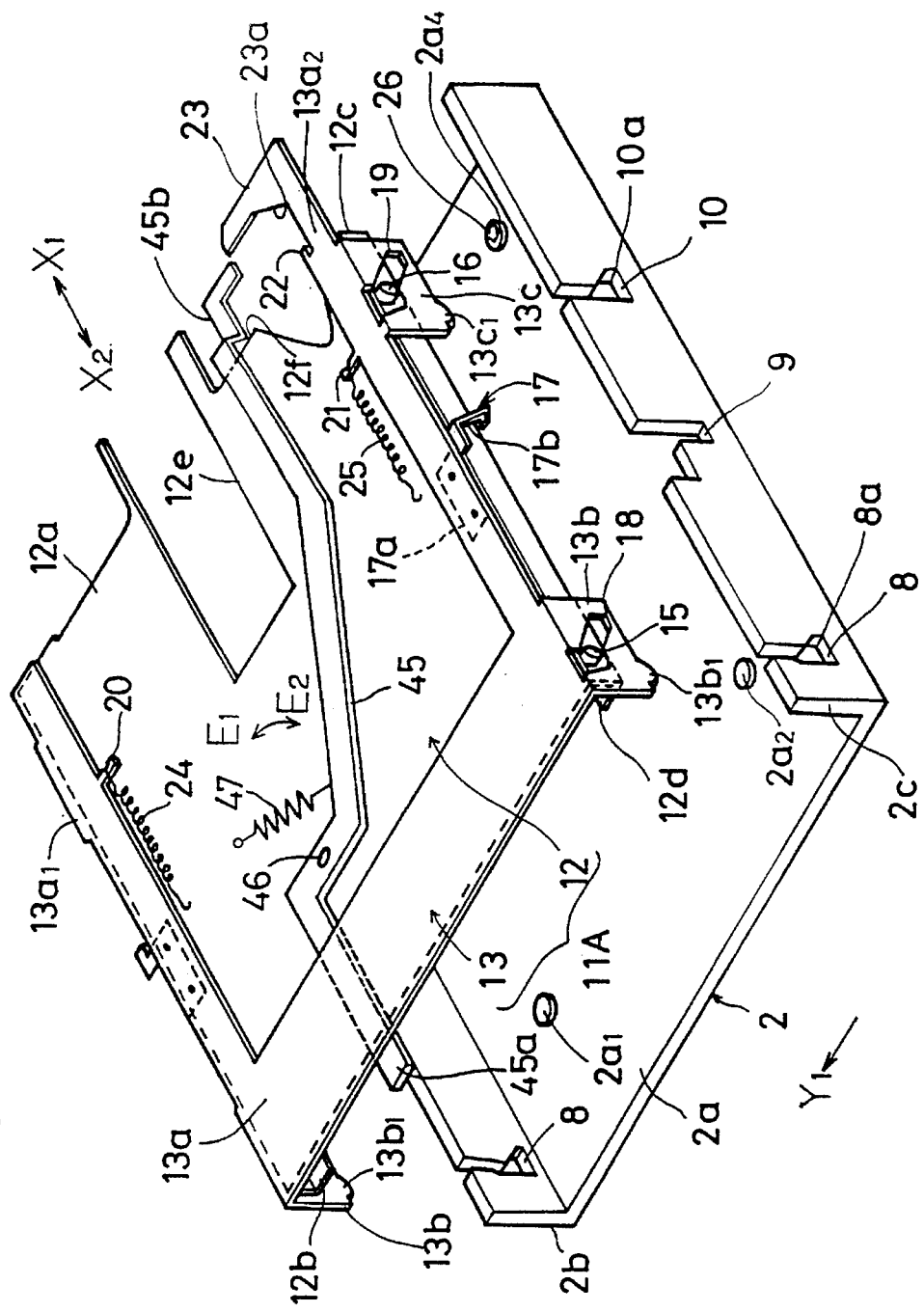
FIG. 21 shows an exploded perspective view of a frame, a slider and a holder, included in the device shown in FIG. 20.
Figure 22:
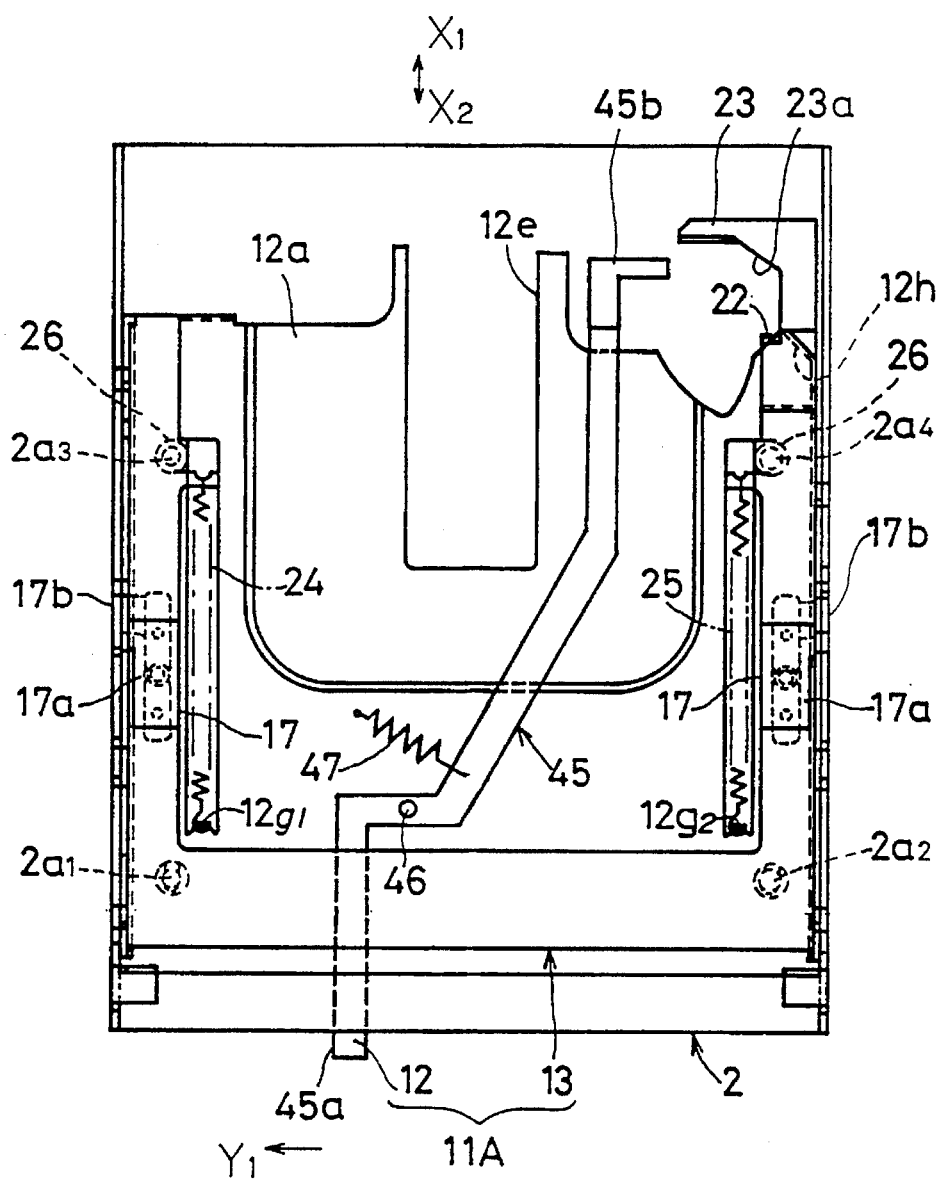
FIG. 22 shows a plan view of the apparatus shown in FIG. 20.
Figure 23A:
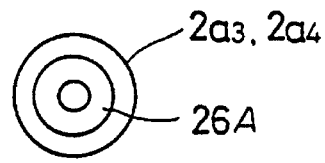
FIGS. 23A and 23B show bosses of the frame shown in FIG. 21, on which the containing case is placed.
Figure 23B:
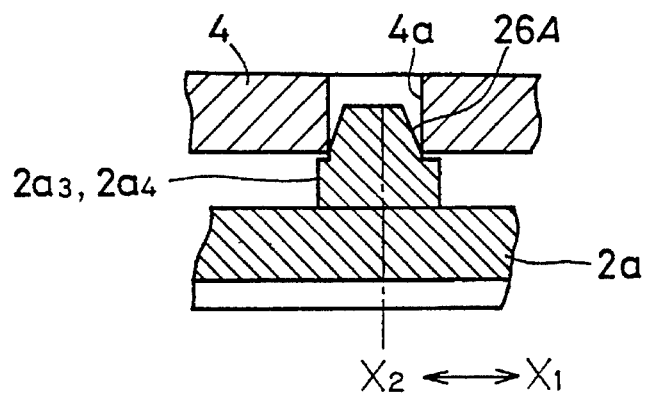

Firstly, actions for loading the containing case 4 are described below with reference to FIGS. 15 through 18, and after that, actions for ejecting the containing case 4 are described. In FIGS. 15, 17 and 18, each of the springs 35 through 40 is omitted for the sake of a clear illustration of the actions of each member.

(1) LOADING ACTIONS

The containing case 4 is inserted into the inserting opening 6 from the front end 4a. The containing case 4, being inserted into the inserting opening 6 in the direction $X_1$ while being pushed, enters into the inserting space 12d of the holder 12, the containing case 4 being then supported by the side plates 12b and 12c on both sides of the case 4. The front end 4a of the containing case 4 contacts the contacting portion 30b of the latch lever 30 of the ejecting mechanism 14, while the containing case 4 is inserted deeply to be placed in the inserting/ejecting position of the holder 12. The containing case 4, being further pushed in the direction $X_1$, pushes the contacting portion 30b of the latch lever 30 in the same direction, thus rotating the latch lever 30 in direction $A_2$. As a result, the torsion spring 35, applying a force to the latch lever 30 to rotate it in the direction $A_1$, is torqued so that the elastic force exerted thereby increases beyond it's previous value due to the deformation by the torque.

Further, as a result of the rotation of the latch lever 30 in the direction $A_2$, the nail portion 30d of the latch lever 30 pushes the roller 32d in the same direction, thus rotating the lever 32 in the direction $B_2$.

The engagement nail 31f of the first lever 31, being hooked by the protrusion 33d of the third lever 33, thus cannot rotate together with the second lever 32. As a result, the second lever 32 rotates relative to the first lever 31. The elastic forces of both the torsion spring 36 and coil spring 38, both acting between the first and second levers 31 and 32 as mentioned above, are thus increased. The torsion spring 36 and coil spring 38 are kept in states where both springs are elastically deformed.

When the containing case 4 has not been inserted into the inserting opening 6 yet, the latch portion 30c, as shown in FIG. 8, engaging the above-mentioned engagement portion 22 of the slider 13, as mentioned above, prevents the slider 13 from sliding in the $X_2$ direction.

After the latch lever 30 has rotated by approximately 60° in the direction $A_2$, as shown in FIG. 15, the latch portion 30c is disengaged from the engagement portion 22. The slider 13 thus slides in the direction $X_2$ by the pulling force of the springs 24 and 25. As a result of this sliding motion of the slider 13, the pins 15 and 16 attached on the holder 12, and fitting the inclined oblong holes 18 and 19 formed in the slider 13 move in the downward direction in FIG. 1. Accordingly, the holder 12 holding the containing case 4 moves downward so as to be placed in the loaded position. Simultaneously, the containing case 4 is placed on the bosses $2a_1$ through $2a_4$ located on the frame 2, the holes 4a thus fitting the protrusions 26 of the bosses $2a_3$ and $2a_4$, as shown in FIG. 6B. As a result of the containing case 4 being aligned in the loaded position, it is possible to record data on the magnetic disc contained in the containing case 4 and reproduce data from the magnetic disc.

(2) EJECTING ACTIONS

Figure 16:
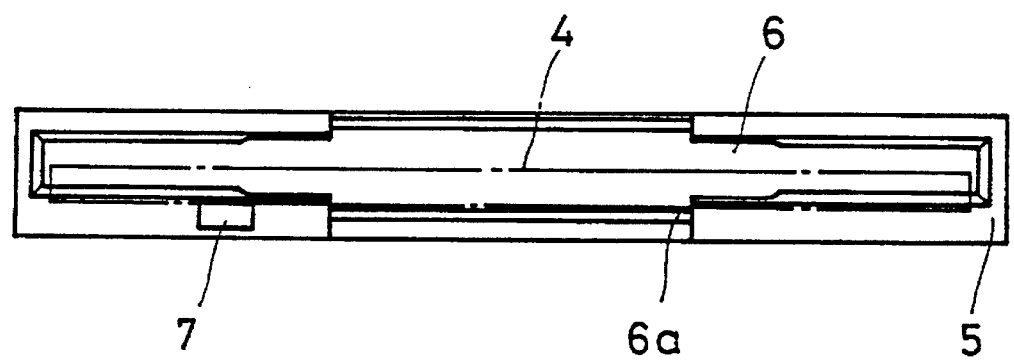
FIG. 16 shows a front view of the apparatus shown in FIG. 2 in a condition where the containing case has been inserted.

When the containing case 4 (shown by an alternate long and short dash line in FIGS. 14 and 16) is in the loading position, the containing case 4 is located, as shown in FIG. 16, in a position lower than that of the inserting opening 6. While the containing case 4 is located there, the back end of the containing case 4 is exposed to the outside through the opening 6a.

After desired operations such as recording data on the magnetic disc in the containing case 4 and reproducing data from the magnetic disc have been performed, the action of pushing the back end of the containing case 4 through the opening 6a in the direction $X_1$ results in the containing case 4 being ejected as described below.

The containing case 4 placed in the loaded position can move in the direction $X_1$ until the inside of the holes 4a of the containing case shown in FIG. 6B, contacts the wall surface 26a of the protrusions 26 of the bosses $2a_3$ and $2a_4$. Further, the holder 13 located in the loaded position with the containing case 4 can move in the direction $X_1$ in the condition where the protrusions 15 and 16 of the holder 13 move along the cutout portions 8a and 10a of the guide slots 8 and 10.

The containing case 4 placed in the loaded position being shifted in the direction $X_1$, as shown in FIG. 17, causes the latch lever 30 to be further pushed in the direction $A_2$. As a result, the contacting portion 30b of the latch lever 30 pushes the contacting portion 34b of the fourth lever 34.

The fourth lever 34 rotates in the direction $D_2$, the contacting portion 34c thereof thus pushing the protrusion 33d of the third lever 33. As a result, the third lever 33 rotates in the direction $C_2$, and the protrusion 33d is disengaged from the engagement nail 31f of the first lever 31, the first lever thus becoming unhooked from the protrusion 33d.

The first lever 31 rotates in the direction $B_2$, the contacting pin 31i of the first lever 31 pushing the inclined cam 23a of the slider 13.

The rotation of the first lever is caused by the elastic forces of the torsion spring 36 and coil spring 38, the elastic forces having been increased by the above-mentioned loading action.

The elastic force acting on the first lever 31, as the result of the increase due to the rotating of the second lever 32 as shown in FIG. 15 and mentioned above, has become stronger. Thus, the elastic force acting on the first lever 31 exceeds the elastic forces of the springs 24 and 25 acting on the slider 13, the slider 13 thus sliding in the direction $X_1$ as a result of the inclined cam of the slider 13 being pushed by the contacting pin 31i as mentioned above. As a result, the holder 12 moves upward by steps, reverse to those of the containing case being inserted, such as the mutual interaction of the protrusions 15 and 16 of the holder 12, and the inclined oblong holes 18 and 19 of the slider 13.

As shown in FIG. 18, the slider 13 returns to the ejecting position as a result of the above-mentioned sliding in the direction $X_1$, the engagement portion 22 of the slider 13 accordingly shifts in the same direction sufficiently so as to release the locking state such that the engagement portion 22 is located on the right side edge, in FIG. 15, of the latch portion 30c of the latch lever 30, this locking state preventing the latch portion 30 from rotating in the direction $A_1$, the torsion spring 35 acting on the latch portion 30 causing it to rotate in the direction. As a result of releasing the locking state, the latch lever 30 rotates in the direction $A_1$ due to the elastic force of the torsion spring 35 which was elastically deformed when the containing case 4 was inserted.

This rotation of the latch lever 30 ejects the containing case 4 in the direction $X_2$ as a result of the latch portion 30b pushing the containing case 4 in the same direction. As a result, the containing case 4 in the holder 12 is pushed out through the inserting opening 6. Thus, the ejecting mechanism 14 returns to the ejected state shown in FIG. 8.

By the above-mentioned actions of the ejecting mechanism 14, only the pushing action performed on the back end of the containing case 4 by the operator causes the containing case 4 to be ejected. As a result, the ejecting button needed in the conventional magnetic disc apparatus can be eliminated. This enables miniaturization and height reducing of the front panel 5 accordingly. Further, when the operator initiates the ejection of the containing case 4 from the magnetic disc apparatus 1, the target to be pushed so as to initiate the ejection is relatively large, the target being the end of the containing case 4 exposed through the opening 6a as shown in FIG. 16. The ejecting button of the conventional magnetic disc apparatus is generally the smaller than the target in this apparatus 1. This larger target facilitates a reliable ejecting action.

Accordingly, the device for loading a recording medium according to the first embodiment of the present invention facilitates the ejecting action of a recording medium such as the magnetic disc with the containing case 4 by merely pushing the loaded recording medium, thus a behavior of the device in operation is able to be improved. Further, the ejecting button needed in the conventional device being able to be eliminated enables miniaturization and height reducing of the front surface of the apparatus employing the device, and creates flexibility for artistic design of the outer appearance of the apparatus applying the device.

Further, the first embodiment of the present invention has a locking mechanism included in the above-mentioned ejecting mechanism 14. In the locking mechanism, the locking state is produced (in the first embodiment, by means of the protrusion 33d and the engagement portion 31i) in the condition where the elastic force of the force applying members such as the torsion spring 36 and the coil spring 38 are increased as a result of the recording medium such as the magnetic disc with the containing case 4 having been first pushed. Then, the locking state is released so that the elastic forces of the force applying members eject containing case 4, as a result of the second pushing of the containing case 4, as mentioned above. Such a mechanism as the locking mechanism of the "push-push method" (this name resulting from the above-mentioned first and second pushing operation on the containing case 4) can be applied to other apparatuses in a wide rankle of fields, the apparatus not being limited to such a magnetic recording/reproducing apparatus. The push-push method enables easier operation for inserting/ejecting with relatively small force.

The containing case 4 has an opening (window) for the magnetic head of the magnetic disc apparatus 1 to come into contact with the magnetic disc in the containing case 4, the opening being covered, for the purpose of protection of the magnetic disc, by a shutter on containing case 4 when the containing case 4 is not loaded in the magnetic disc apparatus 1. There is a construction by which the shutter is opened by means of an opening lever of the magnetic disc apparatus 1 when the containing case 4 is inserted in the holder 12 in the correct orientation. On the other hand, when the containing case 4 is inserted and then loaded in an erroneous orientation, the shutter being thus not able to be opened, the magnetic head may contact the containing case 4. This situation may damage the magnetic head.

To prevent the problem of damaging the magnetic head as a result of an erroneous insertion, the holder 12 has the inclined surface 12h, and the containing case 4 has the chamfered portion 4b as mentioned above. As a result, the containing case 4 can be loaded only when the containing case 4 is inserted in the correct direction, the chamfered portion 4b thus fitting the inclined surface 12h. Further, inserting of the containing case 4 in an erroneous orientation can be prevented because the erroneous insertion results in a corner of the containing case 4 other than the corner having the chamfered portion 4b contacting the inclined surface 12h, as mentioned above.

There are commonly clearances between the pins 15 and 16 of the holder 12, and the guiding slots 8 and 10 acting as guiding portions, these clearances facilitating the movements of the pins 15 and 16 in the guiding slots 8 and 10. The clearances enable the pins 15 and 16 not only to be shifted in the loading direction (upward/downward) but also to be slightly shifted in the inserting/ejecting direction (forward/backward), in the guiding slots 8 and 10. In this construction, when the containing case 4 is further pushed after the corner other than that having the chamfered portion 4b contacts the inclined surface 12h as a result of the erroneous insertion, the containing case 4 should be prevented from being further inserted. However, if the above-mentioned clearances between the pins 15 and 16 and the guiding slots 8 and 10 are too large to prevent the containing case 4 being further inserted, the pins 15 and 16 shift in the inserting direction (forward direction) so much that the containing case 4 may be loaded in the erroneous direction.

The device for loading a recording medium of the first embodiment of the present invention has the above-mentioned force applying member (the leaf springs 17 in the first embodiment) for pushing the pins 15 and 16 in the ejecting direction. An erroneous inserting of the containing case 4 increases the elastic forces of the force applying members, the increased elastic forces then causing the operator who inserts the containing case 4 in the erroneous direction to notice the erroneous inserting by sensing the increased elastic forces transmitted through the containing case 4. As a result, the erroneous insertion can be reliably prevented.

A magnetic disc apparatus 11 employing a device for loading a recording medium of a second embodiment according to the present invention is described below with reference to FIGS. 19 through 30.

The magnetic disc apparatus 11 solves the following problem occurring in the conventional apparatus.

In the ejecting action for ejecting the containing case from the magnetic apparatus, a relatively strong force is needed for pushing the ejecting button so as to achieve the complete ejecting of the containing case. This is because this pushing action must be carried out against a certain elastic force of a spring.

In the description of the magnetic disc apparatus 11, the same reference numerals as those given to the parts of the above-mentioned magnetic disc apparatus 1 are given to parts of the magnetic disc apparatus 11 substantially the same as the corresponding parts of the magnetic disc apparatus 1, and further description of these parts of the magnetic disc apparatus 11 are omitted for the sake of eliminating duplicated description.

An ejecting lever 45, acting as an engagement releasing member, is supported pivotably by a shaft 46 attached to the top surface of the above-mentioned top plate 12a of the holder 12. The ejecting lever 45 has an operating portion 45a at one end, which protrudes from the cutout portion 6b formed in the front panel 5. The ejecting lever 45 has a contacting portion 45b at the other end, which extends towards a below-described ejecting mechanism 14A. The contacting portion 45b is bent so as to approach the above-mentioned protrusion 33d of the third lever 33.

Further, the pulling force of a coil spring 47 acts on the ejecting lever 45 so that the part including the contacting portion 45b of the ejecting lever 45 is pulled in a rotating direction $E_1$. The other part including the operating portion 45a of the ejecting lever 45, contacts stopper 48 protruding from the top plate 12a of the holder 12, the ejecting lever 45 being thus held in a state where the other part of the ejecting lever 45 contacts the stopper 48. Since the ejecting lever 45 goes up or down with the holder 12, it is impossible to carry out the ejecting operation for ejecting the containing case 4 from the magnetic disc apparatus 11 when the holder 12 is located in the inserting/ejecting position (non-recording/reproducing position).

Further, the ejecting operation may be carried out when the holder 12 is located in the recording/reproducing position (loaded position) after the holder 12 has gone down from the non-recording/reproducing position mentioned above. Therefore, the ejecting operation cannot be carried out until the containing case 4 has been inserted therein.

The construction of the above-mentioned ejecting mechanism 14A is described below with reference to FIGS. 24 through 27. In the description of the ejecting mechanism 14A, the same reference numerals as those given to the parts of the above-mentioned magnetic disc apparatus 1, are given to parts of the magnetic disc apparatus 11, when the parts are substantially the same as the corresponding parts of the magnetic disc apparatus 1, and further description of these parts of the magnetic disc apparatus 11 is omitted for the sake of eliminating duplicated description.

Figure 24:
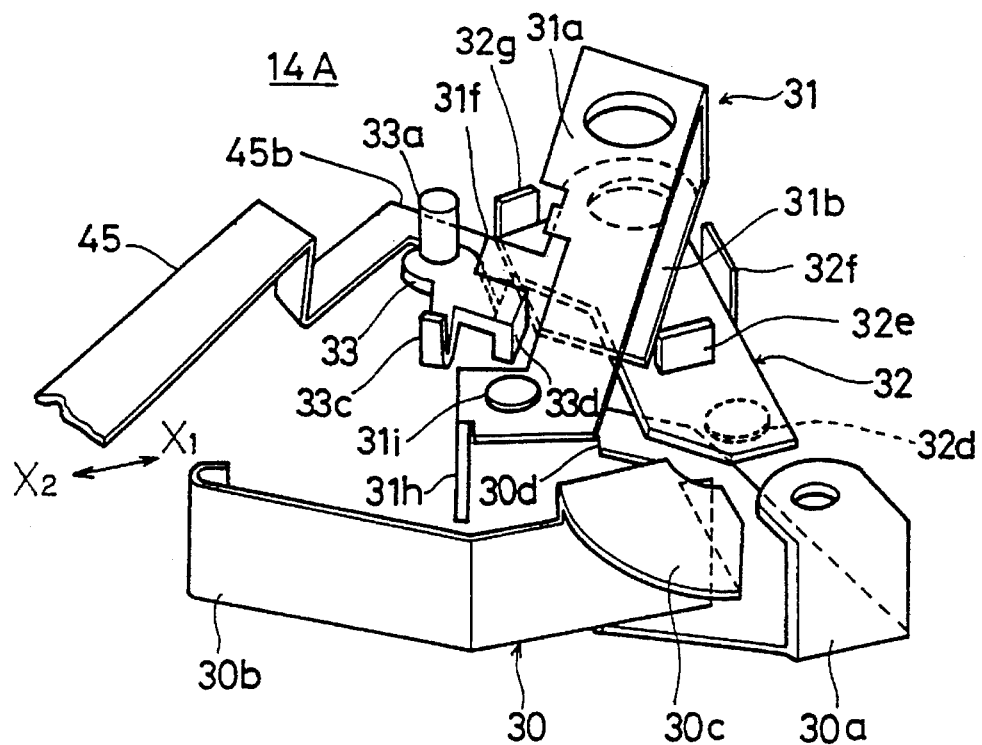
FIG. 24 shows a perspective view of an ejecting mechanism employed in the device shown in FIG. 19.
Figure 25:
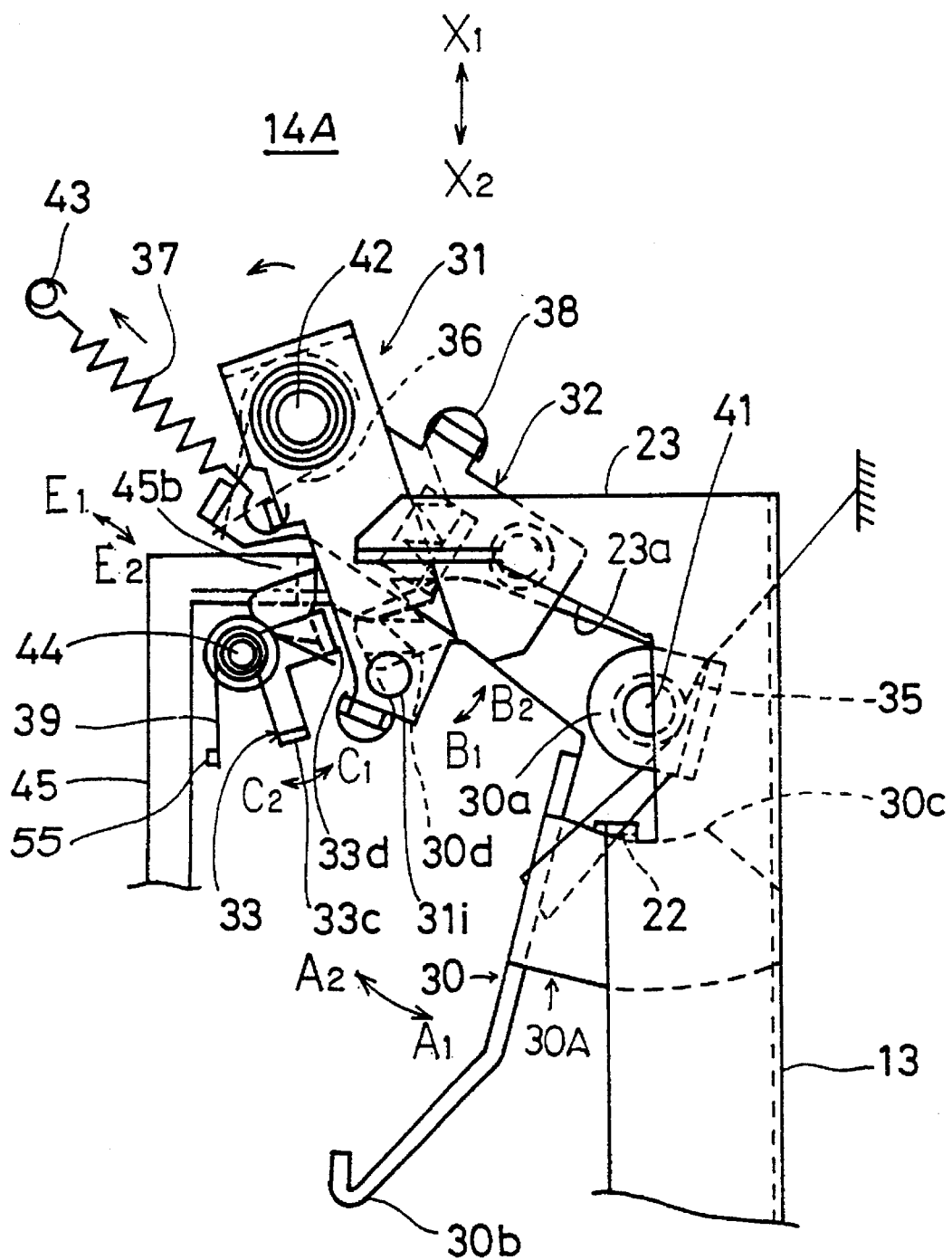
FIG. 25 shows a plan view of the ejecting mechanism shown in FIG. 24 before the containing case is inserted.
Figure 26:
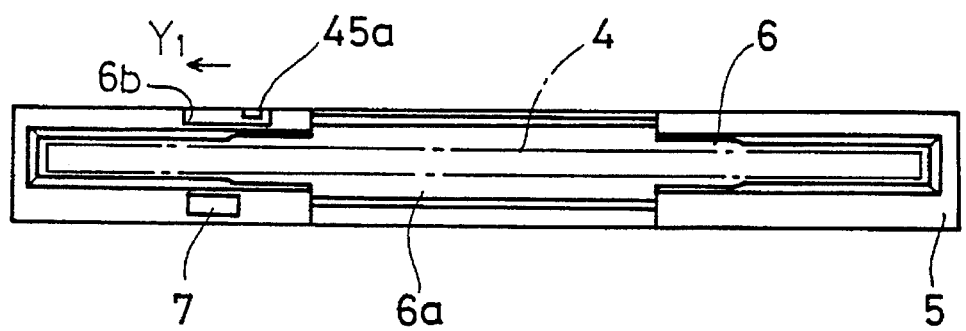
FIG. 26 shows a front view of the apparatus shown in FIG. 20 in a condition where the containing case is being inserted.
Figure 27:
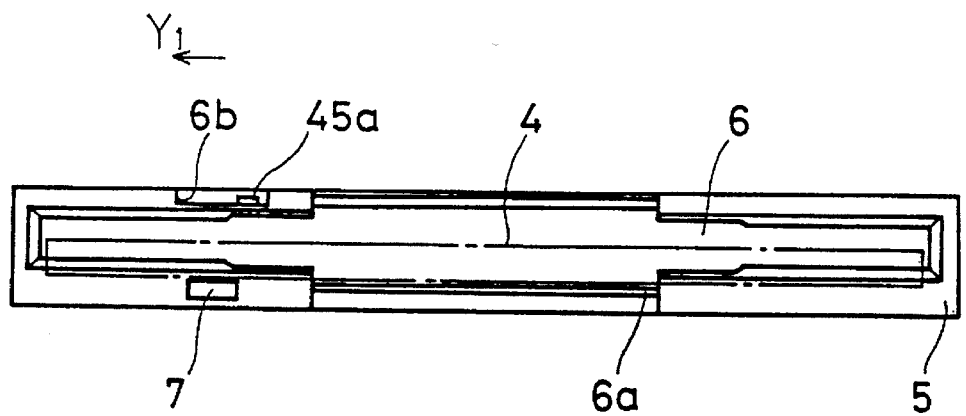
FIG. 27 shows a front view of the apparatus shown in FIG. 20 in a condition where the containing case has been inserted.

As shown in FIGS. 24 and 25, generally, the ejecting mechanism 14A has latch lever 30 the same as that in the magnetic disc apparatus 1, first through third levers 31 through 33 respectively the same as those in the magnetic disc apparatus 1, (the fourth lever 34 used in the magnetic disc apparatus 1 is not needed, it being substituted by the contacting portion 45b of the ejecting lever 45, in the magnetic disc apparatus 11), and springs 35 through 39 the same as those in the magnetic disc apparatus 1 (the spring 40 used in the apparatus 11 is not needed in the apparatus 11 due to the above-mentioned substitution by the contacting portion 45b of the ejecting lever 45).

The protrusion 33d of the third lever 33 is approached by the contacting portion 45b of the ejecting lever 45. The contacting portion 45b further approaches the protrusion 33d due to the loading of the containing case 4 in the magnetic disc apparatus 11 because the ejecting lever 45 moves toward the ejecting mechanism 14A due to the holder 12 shifting to the loaded position.

Further, as shown in FIGS. 6A and 6B, each of the rear bosses $2a_2$ and $2a_4$ has a respective protrusion 26A located o the top of the boss. The protrusions 26A are used or determining the position (the position for recording/reproducing), along the forward and backward directions ($X_2$ and $X_1$), of the containing case 4 loaded in the magnetic disc apparatus 1, as a result of each of the protrusions 26 fitting with a respective one of holes 4a formed on the containing case 4. Each of the protrusions 26A has a shape approximately similar to a cone.

Actions in the magnetic disc apparatus 11 different from those in the magnetic disc apparatus 1, are described below.

(1) LOADING ACTIONS

Figure 28:
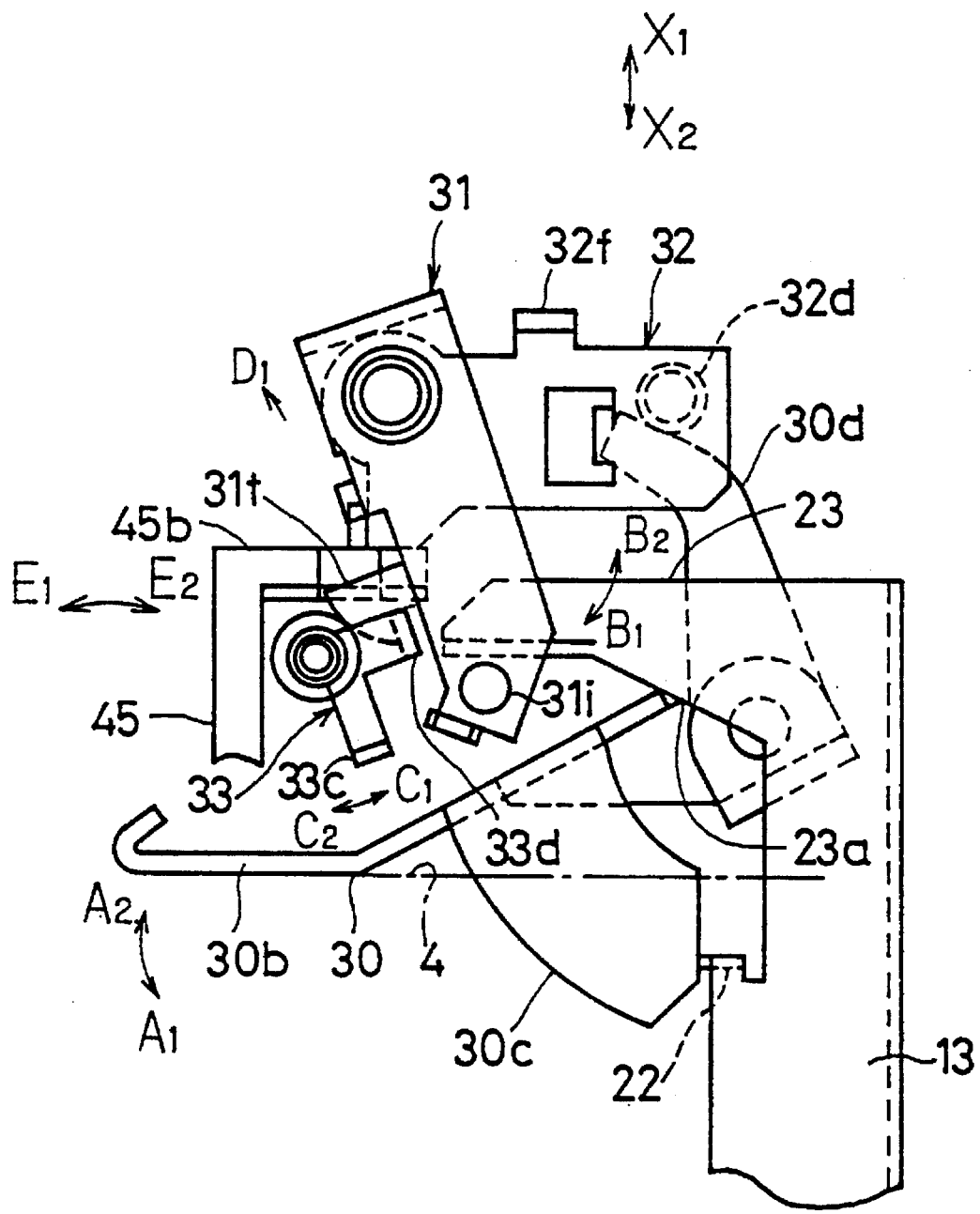
FIG. 28 shows a plan view of the ejecting mechanism shown in FIG. 24 in a condition where the containing case has been inserted.

When the holder 12 goes down so as to be located in the loaded position, the contacting portion 45b of the ejecting lever 45 also goes down so as to face the protrusion 33d of the third lever 33 of the ejecting mechanism 14A, as shown in FIG. 28, as mentioned above.

(2) EJECTING ACTIONS

When the containing case 4 is loaded in the magnetic disc apparatus 11, the operating portion 45a of the ejecting lever 45 protrudes through the cutout portion 6b.

When the containing case 4 is to be ejected from the magnetic disc apparatus 11, it is necessary for the operator to operate the operating portion 45a so that the operation portion 45a slides in the left direction ($Y_1$ direction).

Figure 29:
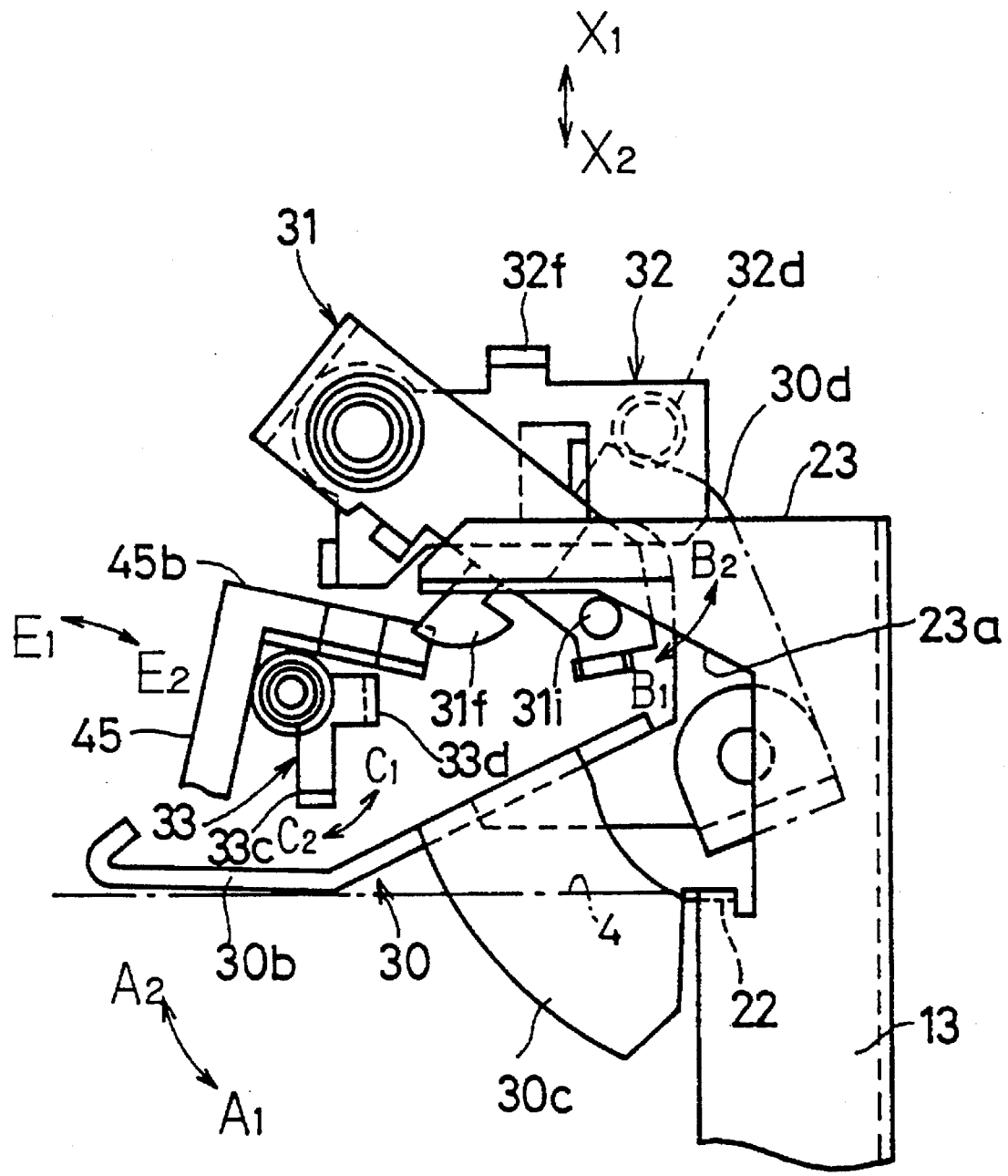
FIG. 29 shows a plan view of the ejecting mechanism shown in FIG. 24 in a condition where the containing case is being ejected.
Figure 30:
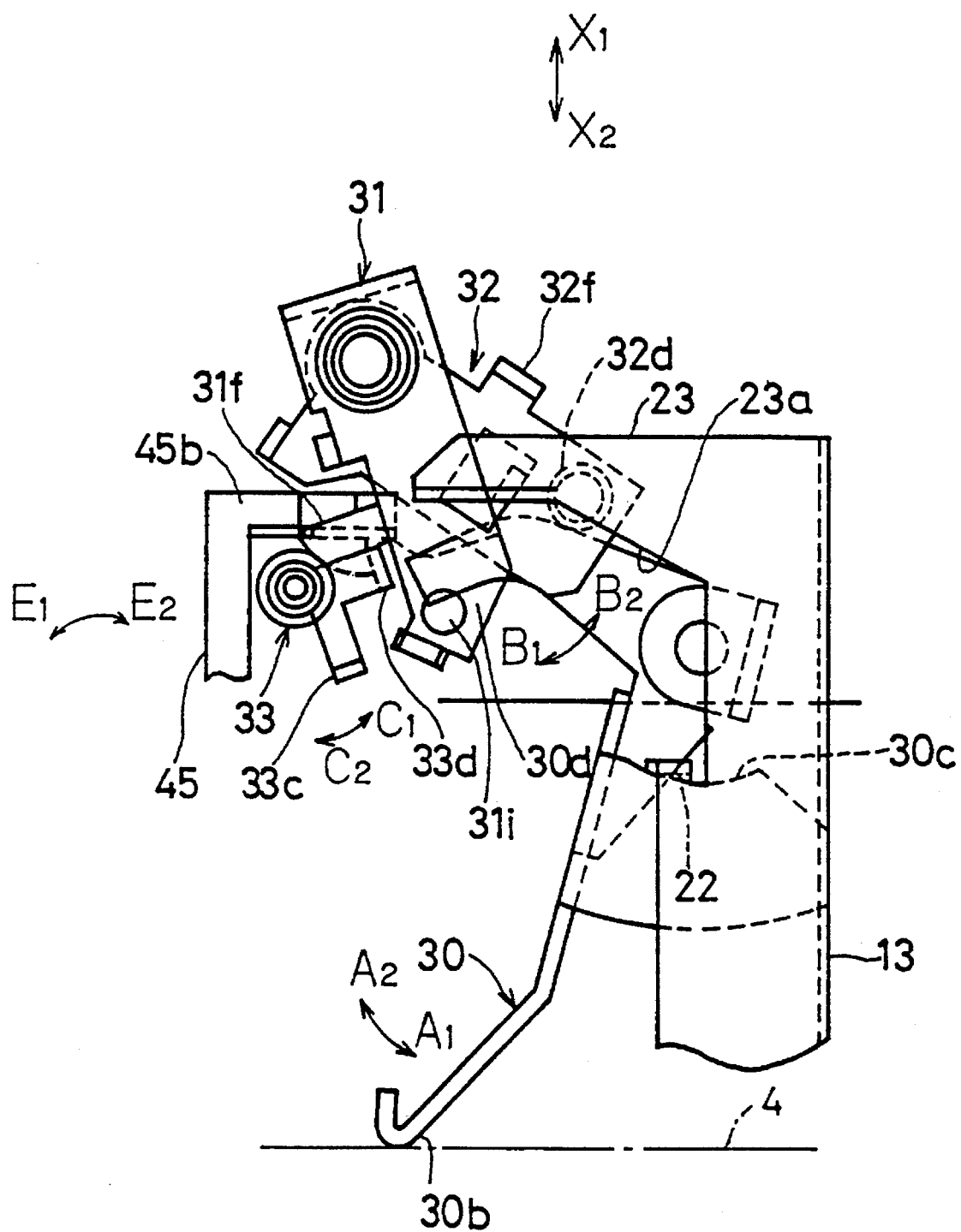
FIG. 30 shows a plan view of the ejecting mechanism shown in FIG. 24 in a condition where the containing case has been ejected.

The shifting of the operating portion 45a of the lever 45 as a result of the above-mentioned sliding, as shown in FIG. 29, results in the contacting portion 45b of the lever 45 rotating in the clockwise direction ($E_2$ direction) so that the contacting portion 45b pushes the protrusion 33d of the third lever 33. As a result, the third lever 33 rotates in the direction $C_2$, this rotation releasing the locking, by the engagement of the protrusion 33d, of the engagement portion 31f of the first lever 31. Thus, the elastic forces exerted by the torsion spring 36 and coil spring 38 due to the above-mentioned deformation, thus act on the first lever 31 so as rotate it in the direction $B_2$. The rotation of the first lever 31, in a similar manner to the magnetic disc apparatus 1, causes the contacting pin 31i to push the inclined cam 23a of the slider 13. This results in the action of the holder 12 for ejecting the containing case 4, in a manner similar to the magnetic disc apparatus 1.

In the magnetic disc apparatus 11, the shifting of the operation portion 45a of the ejecting lever 45 causes the lever 33 to move so as to release the locking of the first lever 31, the containing case 4 thus being ejected as a result. In this method, a relatively small force can achieve the ejection of the containing case 4, the small force being applied to the operation portion 45a of the ejecting lever 45. For example, some one without much physical strength can easily carry cut the ejecting operation.

In the device for loading the recording medium of the second embodiment of the present invention, the shifting of the engagement member by the operation of the engagement releasing member releases the elastic member so that the elastic forces stored in the elastic member act on the moving member so as to move it, as mentioned above. Thus, relatively small strength is sufficient to result in the ejecting of the recording medium. This realizes an easier ejecting operation, even if the operator is someone without much strength.

Further, another feature of the first and second embodiments of the present invention as relates to the inclined cam 23a of the hook 23 of the slider 13 is described below. As mentioned above, referring to FIGS. 17 and 29, the containing case 4 is ejected as a result of the slider 13 sliding in the ejecting direction $X_2$. This sliding of the slider 13 is caused by an engagement portion (the contacting pin 31i in the above-mentioned embodiments) of a below-described returning mechanism 31A pushing the hook 23 (having a shape similar to an L-character), the pushing caused by the elastic forces of the torsion spring 36 and coil spring 38 of the returning mechanism 31A. In the case that the above-mentioned inclined cam 23a is not formed in the-inside corner of the hook 23 (this means the inside corner of the hook 23 having an angle of approximately 90°, play (a clearance) between the hook 23 and the engagement portion of the returning mechanism 31A requires an extra stroke which the engagement portion of the returning mechanism 31A must move. This extra stroke may exceed the deformation range of the torsion spring 38/coil spring 38, the returning mechanism 31A thus not being able to slide the slider 13, and the containing case 4 not being able to be ejected completely.

The above-mentioned returning mechanism 31A for returning the slider i3 to the inserting/ejecting position has the above-mentioned first lever 31, second lever 32, torsion spring 36 and coil spring 38.

The devices for loading the recording medium of the first and second embodiments according to the first and second embodiments, relating to the devices that are included in the magnetic disc apparatus 1 and 11, of the present invention have inclined cams such as the inclined cam 23a, thus the stroke needed for the engagement portion (the contacting pin 31i) of the returning mechanism 31A to move so as to push the slider 13 to be ejected completely can be shortened. As a result, the movement of the returning mechanism 31A can be relatively small, thus the deformation range of the elastic members required is restricted, thus the damaging of the elastic members can be prevented. Further, it is possible to reliably shift the slider 13 to the ejecting position.

The present invention is not limited to the device for loading the containing case containing the flexible magnetic disc. Further, the present invention can be applied to a device for loading recording media other than the containing case for the magnetic disc, for example, a tape cassette containing a magnetic tape, an IC (Integrated Circuit) card, an optical disc, an optical magnetic disc, and other similar recording media.

Further, the present invention is not limited to the above described embodiments, and variations and modifications may be made without departing from the scope of the present invention.

What is claimed is:

1. A device for loading into a structure a recording medium apparatus in which data is recorded on or reproduced from, said device comprising:

a holder into which the recording medium apparatus is inserted, said holder having means for preventing erroneous insertion of said recording medium apparatus in said structure;

a moving mechanism which slides to move said holder between a recording/reproducing position at which recording/reproducing on/from the apparatus occurs and a non-recording/reproducing position;

biasing means for biasing said moving mechanism so that said holder is at said position at which recording/reproducing occurs on the apparatus;

detecting means for detecting movement of the apparatus;

keeping means for keeping said moving mechanism at a position so that said holder is kept at said non-recording/reproducing position; and a returning mechanism including driving means which responds to the detecting of the apparatus's movement by said detecting means so as to drive said moving mechanism, against a biasing force applied by said biasing means, so that said moving mechanism moves to the position at which said keeping means keeps said moving mechanism;

said moving mechanism having a cam arrangement on which said driving means slides during the driving of said moving mechanism by said driving means.

2. The device according to claim 1, wherein:

said moving mechanism comprises a moving member for moving said holder together with said recording medium apparatus between said recording/reproducing position and said non-recording/reproducing position in response to one of an inserting operation being executed or a return movement operation being executed;

said returning mechanism comprises an elastic member for pushing said moving member in a return movement direction so as to cause said moving member to move said holder together with said recording medium apparatus from said recording/reproducing position into said non-recording/reproducing position; and said device further comprises;

an engagement member for locking said elastic member in an elastically deformed state when said holder is located in said recording/reproducing position; and an engagement releasing member for shifting said engagement member to an engagement releasing position so as to release the locking of said elastic member so that the elastic force of said elastic member is applied to said moving member to move said moving member in said return movement direction.

3. The device according to claim 2, further comprising:

pins projecting from both sides of said holder; and guiding portions in said structure for guiding the motion of said pins so as to guide the motion of said holder;

wherein said pins and guiding portions cooperatively act so as to make said holder suitably move between said recording/reproducing position and said non-recording/reproducing position.

4. The device according to claim 3, wherein:

said guiding portions comprise appropriately shaped walls formed in the structure;

said guiding portions guide said holder to move to said recording/reproducing position, when said recording medium apparatus is inserted in an inserting direction into said device, so that said recording medium apparatus is loaded; and said guiding portions guide said holder to move to said non-recording/reproducing position in response to said recording medium apparatus being pushed and then moved in a direction opposite to said inserting direction, so that said recording medium apparatus is ejected.

5. The device according to claim 3, wherein said guiding portions are formed to allow said holder together with said recording medium apparatus to move in an inserting direction corresponding to the direction in which said recording medium apparatus is inserted in said device when said recording medium apparatus is at said recording/reproducing position.

6. The device according to claim 5, further comprising a force applying member for applying a force to said holder so that said pins are pushed onto said guiding portions when said recording medium apparatus moves in the direction of return movement.

7. A device for loading a recording medium apparatus into a structure in which data is recorded on, or reproduced from, the recording medium apparatus, said device comprising:

a holder in which the recording medium apparatus is inserted;

a moving mechanism for moving said holder between a recording/reproducing position and a non-recording/reproducing position, said structure being formed such that said recording medium apparatus has a portion that is exposed to the exterior of the structure when the apparatus is in the recording/reproducing position so that said recording medium apparatus may be manually contacted by an operator;

a returning mechanism for causing said moving mechanism, in response to the operator pushing directly on the exposed portion of the recording medium apparatus when said holder is located in the recording/reproducing position, to move the recording medium apparatus to the non-recording/reproducing position;

a slider for shifting said holder between said non-recording/reproducing position and said recording/reproducing position; and wherein said returning mechanism comprises driving means for driving said slider by pushing an L-shaped hook formed on said slider as a result of the recording medium apparatus being pushed in an inserting direction in which said recording medium apparatus is inserted in said structure so that said holder is moved to said recording/reproducing position, wherein said L-shaped hook has an inclined cam which is formed at the inside corner of said L-shaped hook so as to chamfer said corner and onto which inclined cam said driving means slides during the driving of said slider by said driving means, and wherein the driving of said slider causes said holder to move to said non-recording/reproducing position.

8. The device according to claim 7, wherein:

said driving means comprises a rotatably supported engagement member and an elastic member for applying an elastic force to said engagement member as a result of said recording medium apparatus being pushed, said engagement member rotating so as to push said slider; and said slider slides in a predetermined direction so as move said holder to said non-recording/reproducing position responsive to being pushed by said engagement member.

9. A device for loading a recording medium apparatus into a structure in which data is recorded on, or reproduced from, the recording medium apparatus, said device comprising:

a holder in which the recording medium apparatus is inserted;

a moving mechanism for moving said holder between a recording/reproducing position and a non-recording/ reproducing position, said structure being formed such that said recording medium apparatus has a portion that is exposed to the exterior of the structure when the apparatus is in the recording/reproducing position so that said recording medium apparatus may be manually contacted by an operator;

a returning mechanism for causing said moving mechanism, in response to the operator pushing directly on the exposed portion of the recording medium apparatus when said holder is located in the recording/reproducing position, to move the recording medium apparatus to the non-recording/reproducing position;

a first lever having an engagement portion, said first lever being pivotally supported in said device;

a second lever supported in said device coaxially with said first lever;

a force applying member for applying forces to said first and second levers so as to rotate them in opposite directions from each other;

a latch lever to which a force is applied so as to hold it in a latching position before a pushing operation is executed, wherein said pushing operation alternately causes first and second operations, said first operation being one in which said holder moves from said non-recording/reproducing position into said recording/reproducing position and said second operation being one in which said holder moves from said recording/reproducing position into said non-recording/reproducing position, wherein said latch lever rotates due to said pushing operation, and said latch lever then causes said second lever to rotate against the force applied by said force applying member;

an engagement member for locking said engagement portion of said first lever when said pushing operation is executed, said engagement member releasing the locking of said engagement portion of said first lever when said pushing operation is again executed; and a moving member for moving, as a result of said first lever rotating due to the force applied by said force applying member, to a position where said moving member is latched by said latch lever, said rotating of said first lever being caused by the release of the locking by said engagement member.

10. The device according to claim 9, wherein, in response to said first lever being rotated as a result of said locking of said engagement portion of said first lever being released, said first lever, due to the force applied by said force applying member, pushes said moving mechanism so as to make said holder move to said non-recording/reproducing position so as to eject said recording medium apparatus;

the rotation of said second lever by means of said latch lever making said force applying member apply stronger force to said first lever so as to push said moving member more strongly; and when said moving member is at said latched position, said holder is at said non-recording/reproducing position.

* * * * *